US012429784B2

(12) United States Patent
Makisumi et al.

(10) Patent No.: US 12,429,784 B2
(45) Date of Patent: Sep. 30, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Kohei Makisumi, Shizuoka (JP); Kaname Watariguchi, Kanagawa (JP); Kenichi Kaku, Shizuoka (JP); Haruyuki Tsuji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 608 days.

(21) Appl. No.: 17/816,028

(22) Filed: Jul. 29, 2022

(65) Prior Publication Data

US 2023/0075407 A1 Mar. 9, 2023

(30) Foreign Application Priority Data

Aug. 6, 2021 (JP) ................................ 2021-130212

(51) Int. Cl.
*G03G 5/047* (2006.01)
*G03G 5/06* (2006.01)
(Continued)

(52) U.S. Cl.
CPC ........... *G03G 5/047* (2013.01); *G03G 5/0696* (2013.01); *G03G 5/144* (2013.01); *G03G 15/75* (2013.01)

(58) Field of Classification Search
CPC ...... G03G 5/047; G03G 5/0696; G03G 5/144; G03G 15/75
See application file for complete search history.

(56) References Cited

U.S. PATENT DOCUMENTS 5,357,320 A 10/1994 Kashimura
5,385,797 A 1/1995 Nagahara
(Continued)

FOREIGN PATENT DOCUMENTS

JP 2002-131953 A 5/2002
JP 2003-195577 A 7/2003
(Continued)

OTHER PUBLICATIONS

U.S. Appl. No. 17/812,227, filed Jul. 13, 2022, Michiyo Sekiya.
(Continued)

*Primary Examiner* — Mark F. Huff
*Assistant Examiner* — Boone Alexander Evans
(74) *Attorney, Agent, or Firm* — VENABLE LLP

(57) ABSTRACT

Provided is an electrophotographic photosensitive member having a feature in that, in a graph that is obtained by a method of measuring an EV curve, and that has a horizontal axis representing I and a vertical axis representing V, when V at I=0.500 [μJ/cm$^2$] is represented by $V_r$ [V], a maximum value of S [V·μJ/cm$^2$] represented by $S=I\cdot(V-V_r)$ in a range of I=0.000 to 0.030 [μJ/cm$^2$] is represented by $S_{max}$ [V·μJ/cm$^2$], and a product of a light amount $I_i$ [μJ/cm$^2$] on the horizontal axis and a potential $V_i$[V] on the vertical axis at a point of intersection between an approximate straight line in a range of I=0.000 to 0.010 [μJ/cm$^2$] and an approximate straight line in a range of I=0.490 to 0.500 [μJ/cm$^2$] is represented by $S_i=I_i\cdot(V_i-V_r)$ [V·μJ/cm$^2$], a ratio of $S_i$ to $S_{max}$, which is represented by $AR=S_i/S_{max}$, satisfies AR≤0.10.

7 Claims, 4 Drawing Sheets

(51) Int. Cl.
*G03G 5/14* (2006.01)
*G03G 15/00* (2006.01)

(56) References Cited

U.S. PATENT DOCUMENTS

| | | | |
|---|---|---|---|
| 5,422,210 | A | 6/1995 | Maruyama |
| 5,455,135 | A | 10/1995 | Maruyama |
| 5,485,250 | A | 1/1996 | Kashimura |
| 6,376,143 | B1 | 4/2002 | Neely |
| 7,585,604 | B2 | 9/2009 | Ogaki |
| 7,910,274 | B2 | 3/2011 | Tanaka |
| 7,927,774 | B2 | 4/2011 | Ogaki |
| 8,455,170 | B2 | 6/2013 | Nakamura |
| 8,778,580 | B2 | 7/2014 | Tsuji |
| 8,783,209 | B2 | 7/2014 | Kaku |
| 8,841,052 | B2 | 9/2014 | Watariguchi |
| 8,974,991 | B2 | 3/2015 | Kawahara |
| 8,980,510 | B2 | 3/2015 | Fujii |
| 9,029,054 | B2 | 5/2015 | Okuda |
| 9,046,797 | B2 | 6/2015 | Fujii |
| 9,063,505 | B2 | 6/2015 | Sekiya |
| 9,068,083 | B2 | 6/2015 | Tanaka |
| 9,069,267 | B2 | 6/2015 | Kaku |
| 9,256,145 | B2 | 2/2016 | Fujii |
| 9,372,417 | B2 | 6/2016 | Fujii |
| 9,372,418 | B2 | 6/2016 | Shida |
| 9,372,419 | B2 | 6/2016 | Tsuji |
| 9,436,106 | B2 | 9/2016 | Kuno |
| 9,459,542 | B2 | 10/2016 | Tanaka |
| 9,500,966 | B2 | 11/2016 | Watariguchi |
| 9,535,347 | B2 | 1/2017 | Watariguchi |
| 9,563,139 | B2 | 2/2017 | Kawahara |
| 9,599,915 | B2 | 3/2017 | Anezaki |
| 9,645,515 | B2 | 5/2017 | Kuno |
| 9,645,516 | B2 | 5/2017 | Kawahara |
| 9,869,032 | B2 | 1/2018 | Kawahara |
| 10,073,362 | B2 | 9/2018 | Fujii |
| 10,162,278 | B2 | 12/2018 | Kuno |
| 10,203,617 | B2 | 2/2019 | Kuno |
| 10,303,085 | B2 | 5/2019 | Sato |
| 10,539,892 | B2 | 1/2020 | Nishida |
| 10,558,132 | B2 | 2/2020 | Ishida |
| 10,558,133 | B2 | 2/2020 | Nakamura |
| 10,831,117 | B2 | 11/2020 | Sakakibara |
| 10,831,118 | B2 | 11/2020 | Watanabe |
| 10,942,462 | B2 | 3/2021 | Ito |
| 11,112,719 | B2 | 9/2021 | Makisumi |
| 11,126,097 | B2 | 9/2021 | Ishida |
| 11,137,716 | B2 | 10/2021 | Hiyama |
| 11,150,566 | B2 | 10/2021 | Iwasaki |
| 11,181,837 | B2 | 11/2021 | Sekiya |
| 11,237,493 | B2 | 2/2022 | Makisumi |
| 11,249,407 | B2 | 2/2022 | Watariguchi |
| 11,256,186 | B2 | 2/2022 | Shimozawa |
| 11,340,553 | B2 | 5/2022 | Watariguchi |
| 11,366,402 | B2 | 6/2022 | Ishiduka |
| 11,392,050 | B2 | 7/2022 | Nishida |
| 2014/0004450 | A1 | 1/2014 | Tokimitsu |
| 2014/0141362 | A1 | 5/2014 | Watariguchi |
| 2015/0093693 | A1 | 4/2015 | Watariguchi |
| 2015/0316863 | A1 | 11/2015 | Tanaka et al. |
| 2015/0346617 | A1 | 12/2015 | Kawahara |
| 2015/0362847 | A1 | 12/2015 | Tanaka |
| 2016/0131985 | A1 | 5/2016 | Tanaka et al. |
| 2018/0314171 | A1* | 11/2018 | Watariguchi ......... G03G 5/0525 |
| 2019/0243260 | A1* | 8/2019 | Ito .......................... G03G 5/144 |

FOREIGN PATENT DOCUMENTS

| | | | |
|---|---|---|---|
| JP | 2005-140963 | A | 6/2005 |
| JP | 2005-526267 | A | 9/2005 |
| JP | 2015-210498 | A | 11/2015 |
| JP | 2015-222415 | A | 12/2015 |
| JP | 2015-222416 | A | 12/2015 |
| JP | 2016-105159 | A | 6/2016 |
| JP | 2017-83585 | A | 5/2017 |
| JP | 2019-139012 | A | 8/2019 |
| JP | 2019-139021 | A | 8/2019 |
| JP | 2019-139225 | A | 8/2019 |
| JP | 2021-67748 | A | 4/2021 |

OTHER PUBLICATIONS

U.S. Appl. No. 17/814,048, filed Jul. 21, 2022, Kaname Watariguchi.
U.S. Appl. No. 17/814,603, filed Jul. 25, 2022, Hideharu Shimozawa.
U.S. Appl. No. 17/814,655, filed Jul. 25, 2022, Tatsuya Yamaai.
U.S. Appl. No. 17/815,276, filed Jul. 27, 2022, Akihiro Maruyama.
U.S. Appl. No. 17/816,024, filed Jul. 29, 2022, Kenichi Kaku.
U.S. Appl. No. 17/936,088, filed Sep. 28, 2022, Shuntaro Watanabe.
U.S. Appl. No. 17/937,509, filed Oct. 3, 2022, Nobuhiro Nakamura.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, and a process cartridge and an electrophotographic apparatus each using the electrophotographic photosensitive member.

Description of the Related Art

An electrophotographic photosensitive member (hereinafter sometimes referred to simply as "photosensitive member") to be used for an electrophotographic apparatus is generally obtained by forming various layers such as a photosensitive layer on a support. In addition, from the viewpoints of low price and high productivity, an organic photosensitive member in which a main component of the layer to be formed on the support is a resin has gained widespread use as the electrophotographic photosensitive member in recent years. In particular, an organic photosensitive member in which the photosensitive layer is a laminated photosensitive layer is dominant because of being advantageous in terms of high sensitivity and diversity of material design. A laminated organic photosensitive member has a configuration in which a charge-generating layer containing a charge-generating substance, such as a photoconductive dye or a photoconductive pigment, and a charge-transporting layer containing a charge-transporting substance, such as a photoconductive polymer or a photoconductive low-molecular-weight compound, are laminated. Through technological development in recent years, rapid progress has been made in increasing the speed of an electrophotographic process, and hence the photosensitive member has been required to have a high-sensitivity characteristic that allows its surface potential to be sufficiently decreased even within a short exposure time. In particular, in a relationship (hereinafter referred to as "EV curve") between an exposure amount $I_{exp}$ [$\mu J/cm^2$] radiated to the photosensitive member and the absolute value $V_{exp}$ [V] of the resultant surface potential, linearity, that is, to what extent a slope in the vicinity of $I_{exp}=0$ is maintained even in a high light amount region is important.

Meanwhile, the electrophotographic process related to the photosensitive member is mainly formed of four processes of charging, exposure, development, and transfer, and as required, processes of cleaning, pre-exposure, and the like are added. Of those, the exposure process, by which the charge distribution of the photosensitive member is controlled to cause the surface of the photosensitive member to have a desired potential distribution, is a process crucial for forming an electrostatic latent image.

There are two methods of controlling the image density of the electrophotographic apparatus in the exposure process: an analog gradation system and a digital gradation system. The analog gradation system is a system involving regulating the exposure amount to set the average potential of the surface of the photosensitive member to a desired value, and controlling a toner development amount for the photosensitive member at the time of the development process to represent a density gradation from a non-toner-developed portion (so-called solid white) to a maximally toner-developed portion (so-called solid black). On the other hand, in the digital gradation system, a light amount at the time of light emission is constantly fixed at its maximum, and the surface potential of the photosensitive member at a light-irradiated portion is minimized, to thereby maximize the toner development amount of the light-irradiated portion. That is, in the case of the digital gradation system, the inside of a one-dot region irradiated with light is constantly solid black. The density gradation is represented by controlling the area ratio of the solid black one dot.

A semiconductor laser to be used in the electrophotographic apparatus in recent years has a small spot diameter, and hence the digital gradation system is dominant. However, the semiconductor laser generally has a light amount distribution of a hanging bell shape, and its $1/e^2$ diameter is typically from several tens of μm to 100 μm. Typical resolutions of the electrophotographic apparatus are 300 dpi, 600 dpi, and 1,200 dpi, and one-dot lengths in the respective cases are about the same, i.e., 84 μm, 42 μm, and 21 μm. Accordingly, in actuality, both of a digital gradation and an analog gradation are present as a mixture, and a ratio therebetween is influenced by the number of lines at the time of image formation. As the number of lines becomes lower, an image frequency becomes lower and the spot diameter becomes relatively smaller, and hence the mixture becomes closer to the digital gradation. Conversely, as the number of lines becomes higher, the image frequency becomes higher and the spot diameter becomes relatively larger, and hence the mixture becomes closer to the analog gradation.

As described above, in order to obtain a satisfactory density gradation characteristic in the above-mentioned electrophotographic apparatus in which a digital gradation and an analog gradation are present as a mixture, there is a need to set such an exposure light amount as to strike a balance between the digital gradation and the analog gradation in electrostatic latent image formation. In that case, when the characteristic of the EV curve of the laminated organic photosensitive member described above is not satisfied, it is difficult to set such exposure light amount. For example, when a laser having a small spot diameter is used in order to meet demands for increases in speed and image quality of the electrophotographic apparatus, a digital gradation property is enhanced. On the other hand, an analog gradation characteristic in a high-line-number halftone tends to be degraded.

In Japanese Patent Application Laid-Open No. 2002-131953, there is a description of a technology for achieving both of high sensitivity and high resolution by incorporating two kinds of specific phthalocyanine pigments.

In Japanese Patent Translation Publication No. 2005-526267, there is a description of a technology for controlling the sensitivity of a photosensitive member by using both type I and type IV titanyl phthalocyanines in the charge-generating layer.

In Japanese Patent Application Laid-Open No. 2003-195577, there is a description of a technology for providing an electrophotographic apparatus, which is excellent in resolution and gradation property, and capable of outputting an image of high image quality without sweeping on the image at high speed, by including an electrophotographic photosensitive member configured to satisfy a specific potential characteristic, a charging unit configured to satisfy a specific charged potential, an exposing unit (image exposing unit) configured to form a digital latent image, and a developing unit configured to perform contact development, and to satisfy a specific developing contrast potential.

SUMMARY OF THE INVENTION

According to an investigation made by the inventors, it has been found that the electrophotographic photosensitive member and the electrophotographic apparatus described in Japanese Patent Application Laid-Open No. 2002-131953, Japanese Patent Translation Publication No. 2005-526267, or Japanese Patent Application Laid-Open No. 2003-195577 are not sufficiently optimized in terms of the EV curve. That is, it has been a challenge to improve the analog gradation characteristic in a high-line-number halftone while maintaining a high-quality digital gradation property through use of a laser having a small spot diameter.

Accordingly, an object of the present invention is to provide an electrophotographic photosensitive member that improves an analog gradation characteristic in a high-line-number halftone while maintaining a high-quality digital gradation property, and a process cartridge and an electrophotographic apparatus each using the electrophotographic photosensitive member.

The above-mentioned object is achieved by the present invention described below. That is, there is provided an electrophotographic photosensitive member including: a support; a charge-generating layer formed on the support; and a charge-transporting layer formed on the charge-generating layer, wherein the electrophotographic photosensitive member is an organic photosensitive member, and wherein, in a graph that is obtained at a temperature of 23.5 [° C.] and a relative humidity of 50 [% RH] in accordance with the following <Method of measuring EV Curve>, and that has a horizontal axis representing $I_{exp}$ and a vertical axis representing $V_{exp}$, when $V_{exp}$ at $I_{exp}$=0.500 [μJ/cm$^2$] in the graph is represented by $V_r$ [V], a maximum value of S [V·μJ/cm$^2$] represented by $S=I_{exp}\cdot(V_{exp}-V_r)$ in a range of $I_{exp}$=0.000 to 0.030 [μJ/cm$^2$] in the graph is represented by $S_{max}$ [V·μJ/cm$^2$], a product of a light amount $I_i$ [μJ/cm$^2$] on the horizontal axis and a potential $V_i$[V] on the vertical axis at a point of intersection between an approximate straight line in a range of $I_{exp}$=0.000 to 0.010 [μJ/cm$^2$] and an approximate straight line in a range of $I_{exp}$=0.490 to 0.500 [μJ/cm$^2$] in the graph is represented by $S_i=I_i\cdot(V_i-V_r)$ [V·μJ/cm$^2$], and a value $S_i/S_{max}$ of a ratio of $S_i$ to $S_{max}$ is represented by AR, the AR satisfies AR≤0.10.

<Method of Measuring EV Curve>

(1): A surface potential of the electrophotographic photosensitive member is set to 0 [V].

(2): Charging of the electrophotographic photosensitive member is performed for 0.005 second so that an absolute value of an initial surface potential of the electrophotographic photosensitive member becomes $V_0$ [V].

(3): After 0.02 second from start of the charging, the electrophotographic photosensitive member after the charging is continuously exposed to light having a wavelength of 805 [nm] and an intensity of 25 [mW/cm$^2$] for "t" second(s) so as to achieve an exposure amount of $I_{exp}$ [μJ/cm$^2$].

(4): After 0.06 second from the start of the charging, an absolute value of a surface potential of the electrophotographic photosensitive member after the exposure is measured and represented by $V_{exp}$ [V].

(5): The operations (1) to (4) are repeated while changing $I_{exp}$ from 0.000 [μJ/cm$^2$] to 1.000 [μJ/cm$^2$] at intervals of 0.001 [μJ/cm$^2$], to thereby obtain $V_{exp}$ [V] corresponding to each $I_{exp}$.

(6): In the operations (1) to (5), $V_{exp}$ [V] at t=0 and $I_{exp}$=0.000 [μJ/cm$^2$] in the operation (3) is particularly called a charged potential $V_d$ [V], and the $V_0$ [V] in the operation (2) is set so that the $V_d$ [V] takes a value of 300 V.

According to the present invention, the electrophotographic photosensitive member improved in analog gradation property while maintaining a satisfactory digital gradation property, and the process cartridge and the electrophotographic apparatus each using the electrophotographic photosensitive member can be provided.

Further features of the present invention will become apparent from the following description of exemplary embodiments with reference to the attached drawings.

DESCRIPTION OF THE EMBODIMENTS

Figure 1:
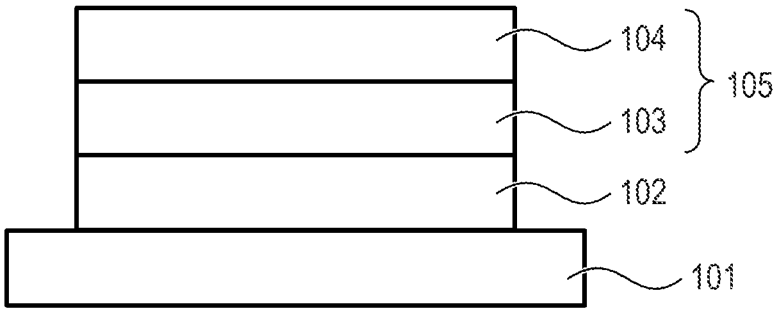
FIG. 1 is an illustration of an example of the layer configuration of an electrophotographic photosensitive member according to the present invention.

The present invention is described in detail below by way of exemplary embodiments.

The present invention relates to an electrophotographic photosensitive member that is an organic photosensitive member including a support and organic photosensitive layers formed on the support, the organic photosensitive layers including a charge-generating layer and a charge-transporting layer formed on the charge-generating layer, wherein, in a graph that is obtained at a temperature of 23.5 [° C.] and a relative humidity of 50 [% RH] in accordance with <Method of measuring EV Curve>, and that has a horizontal axis representing $I_{exp}$ and a vertical axis representing $V_{exp}$, when $V_{exp}$ at $I_{exp}$=0.500 [μJ/cm$^2$] in the graph is represented by $V_r$ [V], a maximum value of S [V·μJ/cm$^2$] represented by $S=I_{exp}\cdot(V_{exp}-V_r)$ in a range of $I_{exp}$=0.000 to 0.030 [μJ/cm$^2$] in the graph is represented by $S_{max}$ [V·μJ/cm$^2$], and a product of a light amount $I_i$ [μJ/cm$^2$] on the horizontal axis and a potential $V_i$[V] on the vertical axis at a point of intersection between an approximate straight line in a range of $I_{exp}$=0.000 to 0.010 [μJ/cm$^2$] and an approximates straight line in a range of $I_{exp}$=0.490 to 0.500 [μJ/cm$^2$] in the graph is represented by $S_i=I_i\cdot(V_i-V_r)$ [V·μJ/cm$^2$], in the case where a value $S_i/S_{max}$ of a ratio of $S_i$ to $S_{max}$ is represented by AR, the AR satisfies AR≤0.10.

<Method of Measuring EV Curve>

(1): A surface potential of the electrophotographic photosensitive member is set to 0 [V].

(2): Charging of the electrophotographic photosensitive member is performed for 0.005 second so that an absolute value of an initial surface potential of the electrophotographic photosensitive member becomes $V_0$ [V].

(3): After 0.02 second from start of the charging, the electrophotographic photosensitive member after the charging is continuously exposed to light having a wavelength of 805 [nm] and an intensity of 25 [$mW/cm^2$] for "t" second(s) so as to achieve an exposure amount of $I_{exp}$ [$\mu J/cm^2$].

(4): After 0.06 second from the start of the charging, an absolute value of a surface potential of the electrophotographic photosensitive member after the exposure is measured and represented by $V_{exp}$ [V].

(5): The operations (1) to (4) are repeated while changing $I_{exp}$ from 0.000 [$\mu J/cm^2$] to 1.000 [$\mu J/cm^2$] at intervals of 0.001 [$\mu J/cm^2$], to thereby obtain $V_{exp}$ corresponding to each $I_{exp}$.

(6): In the operations (1) to (5), $V_{exp}$ [V] at t=0 and $I_{exp}$=0.000 [$\mu J/cm^2$] in the operation (3) is particularly called a charged potential $V_d$ [V], and the $V_0$ [V] in the operation (2) is set so that the $V_d$ [V] takes a value of 300 V.

The present invention also relates to a process cartridge including: the above-mentioned electrophotographic photosensitive member; and at least one unit selected from the group consisting of: a charging unit; a developing unit; and a cleaning unit, the process cartridge integrally supporting the electrophotographic photosensitive member and the at least one unit, and being removably mounted onto a main body of an electrophotographic apparatus.

The present invention also relates to an electrophotographic apparatus including: the above-mentioned electrophotographic photosensitive member; a charging unit; an image exposing unit; a developing unit; and a transferring unit.

The inventors presume as described below as to the reason why such electrophotographic photosensitive member can improve an analog gradation characteristic in a high-line-number halftone while maintaining a high-quality digital gradation property.

Figure 3A:
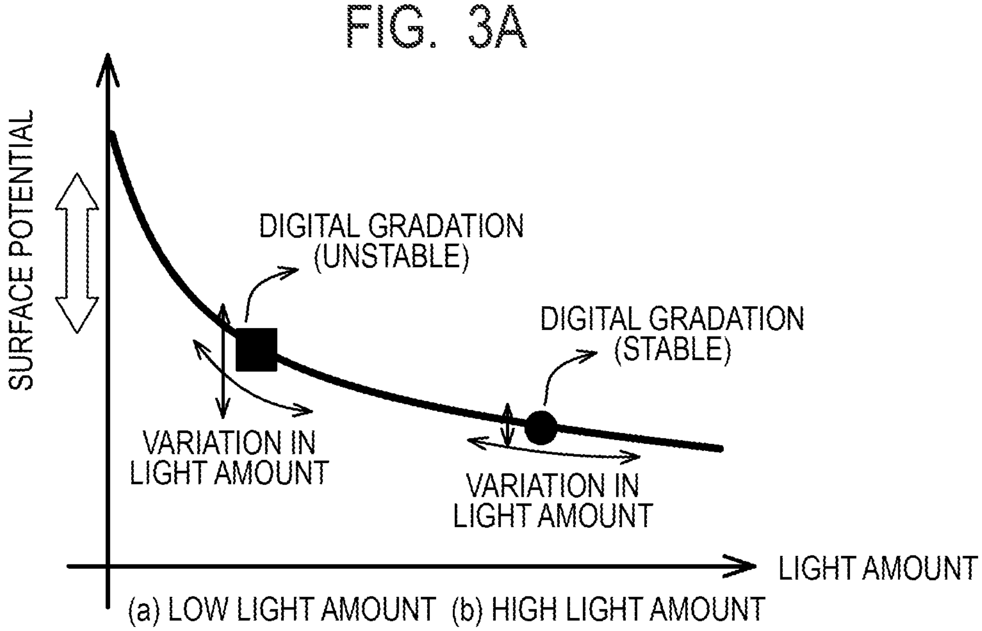
FIG. 3A, FIG. 3B, and FIG. 3C are graphs showing a relationship between an analog gradation and a digital gradation in an EV curve of a related-art photosensitive member.
Figure 3B:
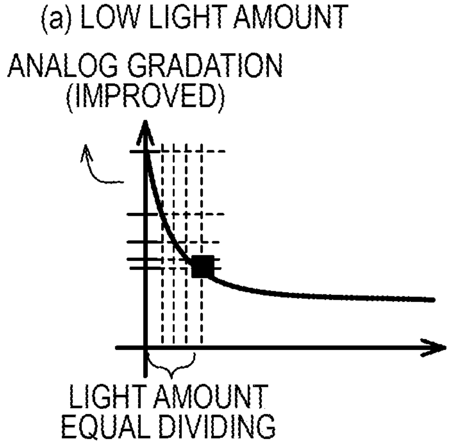
Figure 3C:
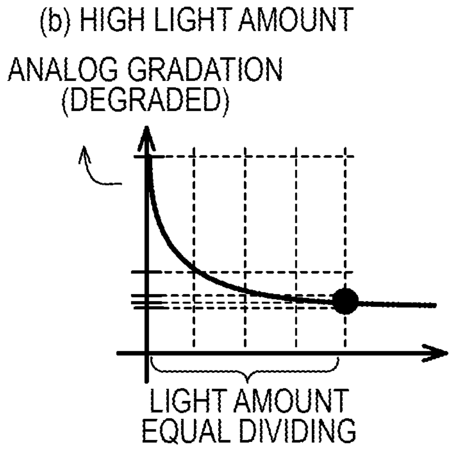

In FIG. 3A, FIG. 3B, and FIG. 3C, a barter relationship between an analog gradation and a digital gradation in an EV curve of a related-art photosensitive member is shown.

In order to improve the digital gradation, it is required that one dot be dense and stable. Accordingly, it is appropriate that a high light amount in a region (b) in the EV curve in FIG. 3A be selected as an image exposure amount. In this case, as shown in FIG. 3A, the absolute value of the slope of the EV curve is small with respect to a variation in light amount, and hence a change in surface potential is stabilized, with the result that one dot is stabilized. In contrast, when a low light amount in a region (a) is selected as the image exposure amount, as shown in FIG. 3A, the absolute value of the slope of the EV curve is large with respect to a variation in light amount, and hence the surface potential is destabilized, with the result that one dot is destabilized.

Meanwhile, in order to improve the analog gradation, it is required that a change in surface potential in the case where the light amount is varied be made close to a linear one. For that purpose, it is appropriate that, in the EV curve in FIG. 3B, a low light amount be selected as the image exposure amount. In this case, as shown in FIG. 3B, when the image exposure amount is equally divided, the surface potential also gets relatively close to equal dividing, and hence the analog gradation is improved. In contrast, when a high light amount is selected as the image exposure amount, as shown in FIG. 3C, when the image exposure amount is equally divided, the surface potential gets farther away from equal dividing, and hence the analog gradation is degraded.

As described above, with regard to what light amount on the EV curve is selected as the image exposure amount, the analog gradation and the digital gradation are generally in a barter relationship.

As described above, when AR≤0.10 is not satisfied, the shape of the EV curve of the photosensitive member is not optimal. Accordingly, as shown in FIG. 3A, the region in which the digital gradation property is satisfactory and the region in which the analog gradation property is satisfactory are away from each other, and hence, when the digital gradation property is to be made satisfactory, the analog gradation property cannot be sufficiently exhibited.

Figure 4:
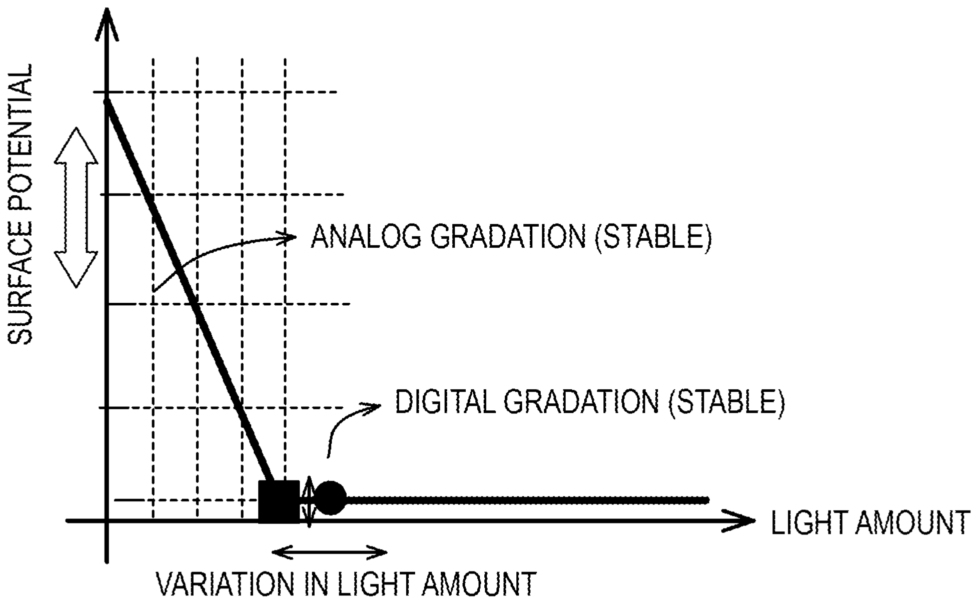
FIG. 4 is a graph showing a relationship between an analog gradation and a digital gradation in an EV curve of the present invention.

Next, in FIG. 4, a relationship between an analog gradation and a digital gradation in an EV curve of a photosensitive member that satisfies AR≤0.10 is shown. As shown in FIG. 4, the light amount regions in which the digital gradation property and the analog gradation property can be sufficiently exhibited are close to each other, and hence the analog gradation characteristic in a high-line-number halftone can be improved while a high-quality digital gradation property is maintained.

[Method of Evaluating EV Curve of Electrophotographic Photosensitive Member]

A method of measuring the EV curve in the present invention is described below.

Figure 5:
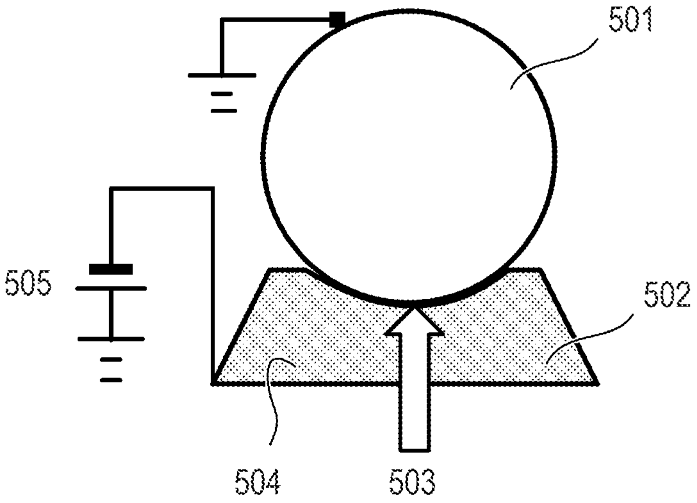
FIG. 5 is a conceptual view of a method of defining an EV curve used for evaluation in the present invention.

In the measurement of the EV curve, a conceptual view of a method of defining the EV curve is illustrated in FIG. 5.

First, quartz glass obtained as follows is prepared (hereinafter referred to as "NESA glass"): an ITO film 504 serving as a transparent ITO electrode is deposited from the vapor onto quartz glass so that the surface of the glass has a sheet resistance of 1,000 [Ω/sq] or less; and the entire surface of the resultant is subjected to optical polishing so that the resultant becomes transparent. As illustrated in FIG. 5, the surface of a photosensitive member 501 is brought into close contact with the NESA glass 502. At this time, when the photosensitive member 501 has a flat plate shape, smooth NESA glass is used, and when the photosensitive member has a cylindrical shape, curved NESA glass as illustrated in FIG. 5 is used. The surface of the photosensitive member can be charged by applying a voltage from a high-voltage power source 505 to the NESA glass 502 under the state. In addition, when flat light having a wavelength of 805 [nm] and an intensity of 25 [$mW/cm^2$] is applied from the lower surface of the NESA glass, the surface of the photosensitive member is subjected to exposure 503, and hence the surface potential thereof can be optically decayed.

When the above-mentioned measuring system is used, the light having an intensity of 25 [$mW/cm^2$], which is stronger than exposure light to be applied to a photosensitive member in an electrophotographic apparatus expected in recent years or in the future, can be applied to the photosensitive member for only a short time period and once, and at the same time, the charging and exposure of the photosensitive member can be repeated in a cycle faster than the process speed of the electrophotographic apparatus expected in recent years or in the future. Thus, a large amount of data in increments of 0.001 [$\mu J/cm^2$] can be stably and simply acquired to provide the EV curve of the photosensitive member of the present invention. In addition, at the same time, a photosensitive member characteristic, which can correspond to the shortening of an exposure irradiation time due to an increase in process speed in recent years or through the future, and a reduction in number of times of exposure when an exposure method is changed from a currently mainstream laser scanning optical system to a LED array, can be evaluated by the above-mentioned measurement method achieved by using the measuring system. In particular, the light irradiation conditions that the photosensitive member be exposed to the light having an intensity of 25 [$mW/cm^2$] for a short time period and once are an EV curve-measuring method that is sufficiently strict through the future in light of the reciprocity failure characteristic of the photosensitive member.

In a graph that is obtained at a temperature of 23.5 [° C.] and a relative humidity of 50 [% RH] in accordance with the following <Method of measuring EV Curve> with the measurement apparatus of FIG. 5, and that has a horizontal axis representing $I_{exp}$ and a vertical axis representing $V_{exp}$, when $V_{exp}$ at $I_{exp}$=0.500 [$\mu J/cm^2$] in the graph is represented by $V_r$ [V], a maximum value of S [$V \cdot \mu J/cm^2$] represented by $S=I_{exp} \cdot (V_{exp}-V_r)$ in a range of $I_{exp}$=0.000 to 0.030 [$\mu J/cm^2$] in the graph is represented by $S_{max}$ [$V \cdot \mu J/cm^2$], and a product of a light amount $I_i$ [$\mu J/cm^2$] on the horizontal axis and a potential $V_i$[V] on the vertical axis at a point of intersection between an approximate straight line in a range of $I_{exp}$=0.000 to 0.010 [$\mu J/cm^2$] and an approximate straight line in a range of $I_{exp}$=0.490 to 0.500 [$\mu J/cm^2$] in the graph is represented by $S_i=I_i \cdot (V_i-V_r)$ [$V \cdot \mu J/cm^2$], AR, which represents a value $S_i/S_{max}$ of a ratio of $S_i$ to $S_{max}$, is calculated.

<Method of Measuring EV Curve>

(1): A surface potential of the electrophotographic photosensitive member is set to 0 [V].

(2): Charging of the electrophotographic photosensitive member is performed for 0.005 second so that an absolute value of an initial surface potential of the electrophotographic photosensitive member becomes $V_0$ [V].

(3): After 0.02 second from start of the charging, the electrophotographic photosensitive member after the charging is continuously exposed to light having a wavelength of 805 [nm] and an intensity of 25 [$mW/cm^2$] for "t" second(s) so as to achieve an exposure amount of $I_{exp}$ [$\mu J/cm^2$].

(4): After 0.06 second from the start of the charging, an absolute value of a surface potential of the electrophotographic photosensitive member after the exposure is measured and represented by $V_{exp}$ [V].

(5): The operations (1) to (4) are repeated while changing $I_{exp}$ from 0.000 [$\mu J/cm^2$] to 1.000 [$\mu J/cm^2$] at intervals of 0.001 [$\mu J/cm^2$], to thereby obtain $V_{exp}$ corresponding to each $I_{exp}$.

(6): In the operations (1) to (5), $V_{exp}$ [V] at t=0 and $I_{exp}$=0.000 [$\mu J/cm^2$] in the operation (3) is particularly called a charged potential $V_d$ [V], and $V_0$ [V] in the operation (2) is set so that the $V_d$ [V] takes a value of 300 V.

Figure 6:
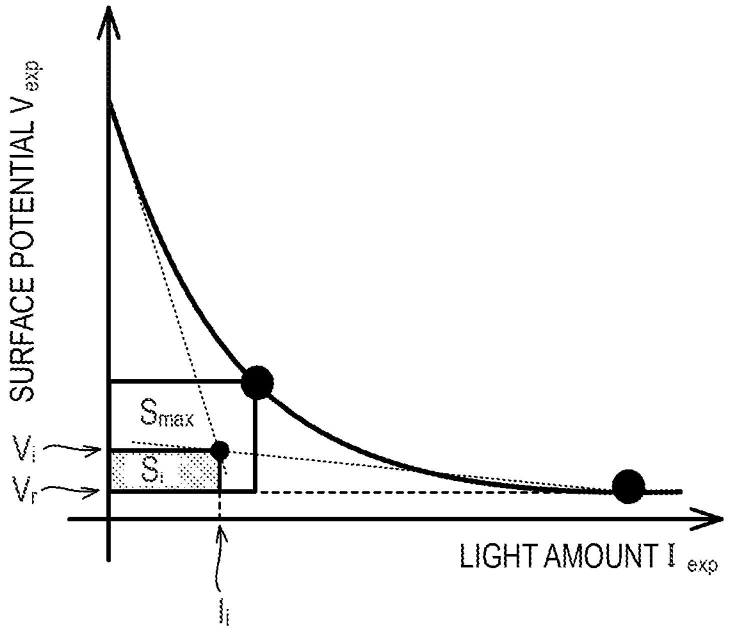
FIG. 6 is a conceptual view of a method of calculating a characteristic used for evaluation in the present invention.

In FIG. 6, a conceptual view of the calculation of $S_i/S_{max}$ in the present invention is shown.

In the case of having the ideal EV curve in the present invention as shown in FIG. 4, the slope of the approximate straight line in the range of $I_{exp}$=0.490 to 0.500 [$\mu J/cm^2$] becomes 0, and hence $S_i$=0. However, in general, as shown in FIG. 3C, the photosensitive member is unable to fully maintain the slope at $I_{exp}$=0, and the slope gradually approaches 0. Accordingly, $S_i$>0, and AR gradually increases. AR is preferably AR≤0.1, more preferably AR≤0.09. In addition, when $V_{exp}$ and $I_{exp}$ at a time when S becomes $S_{max}$ are represented by $V_{max}$ and $I_{max}$, respectively, and $(V_{max}-V_r)/I_{max}$ is represented by $LR_{max}$, $LR_{max}$ satisfies preferably $LR_{max}$≥2,000, more preferably $LR_{max}$≥3,000. Further, $V_r$ [V] preferably satisfies $V_r$≤30.

[Electrophotographic Photosensitive Member]

The electrophotographic photosensitive member of the present invention is an organic photosensitive member including a support and layers formed on the support, the layers each containing a resin as a main component. FIG. 1 is a view for illustrating an example of the layer configuration of the electrophotographic photosensitive member. In FIG. 1, a support is represented by reference numeral 101, an undercoat layer is represented by reference numeral 102, a charge-generating layer is represented by reference numeral 103, a charge-transporting layer is represented by reference numeral 104, and an organic photosensitive layer (laminated photosensitive layer) is represented by reference numeral 105.

As a method of producing the electrophotographic photosensitive member of the present invention, there is given a method involving preparing coating liquids for respective layers to be described later, applying the coating liquids in a desired order of layers, and drying the coating liquids. In this case, as a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

Each layer is described below.

<Support>

In the present invention, the support is preferably a conductive support having conductivity. Examples of the shape of the support include a cylindrical shape, a belt shape, and a sheet shape. Of those, a cylindrical support is preferred. An example of the conductive support is a support in which a thin film of a metal, such as aluminum, chromium, silver, or gold, a thin film of a conductive material, such as indium oxide, tin oxide, or zinc oxide, or a thin film of a conductive ink added thereto a silver nanowire is formed on a support formed of a metal, such as aluminum, iron, nickel, copper, or gold, or an alloy, or an insulating support, such as a polyester resin, a polycarbonate resin, a polyimide resin, or glass.

The surface of the support may be subjected to, for example, electrochemical treatment such as anodization, wet honing treatment, blast treatment, or cutting treatment for improving its electrical characteristics and suppressing interference fringes.

<Conductive Layer>

In the present invention, a conductive layer may be arranged on the support. The arrangement of the conductive layer can cover the unevenness and defects of the support, and prevent interference fringes. The average thickness of the conductive layer is preferably 5 μm or more and 40 μm or less, more preferably 10 μm or more and 30 μm or less.

The conductive layer preferably contains conductive particles and a binder resin. Examples of the conductive particles include carbon black, metal particles, and metal oxide particles. Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver. Of those, metal oxides are preferably used as the conductive particles, and in particular, titanium oxide, tin oxide, and zinc oxide are more preferably used.

When the metal oxides are used as the conductive particles, the surfaces of the metal oxides may be treated with a silane coupling agent or the like, or the metal oxides may be doped with an element, such as phosphorus or aluminum, or an oxide thereof. As the element and the oxide thereof for doping, there are given, for example, phosphorus, aluminum, niobium, and tantalum.

In addition, each of the conductive particles may be of a laminated construction having a core particle and a coating layer coating the particle. Examples of the core particle include titanium oxide, barium sulfate, and zinc oxide. Examples of the coating layer include metal oxides, such as tin oxide and titanium oxide.

In addition, when the metal oxides are used as the conductive particles, the volume-average particle diameter thereof is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin. In addition, the conductive layer may further contain a concealing agent, such as a silicone oil, resin particles, or titanium oxide.

The average thickness of the conductive layer is preferably 1 μm or more and 50 μm or less, particularly preferably 3 μm or more and 40 μm or less. The conductive layer may be formed by preparing a coating liquid for a conductive layer containing the above-mentioned materials and a solvent, forming a coating film thereof, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for the dispersion of the conductive particles in the coating liquid for a conductive layer is, for example, a method including using a paint shaker, a sand mill, a ball mill, or a liquid collision-type high-speed disperser.

<Undercoat Layer>

In the present invention, an undercoat layer may be arranged on the support or the conductive layer, and a configuration including an undercoat layer formed between the support and the charge-generating layer is preferred. The arrangement of the undercoat layer enhances an interlayer adhesion function, and can impart a charge injection-blocking function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, a conductive polymer, or the like for the purpose of enhancing electric characteristics, and may be subjected to surface treatment as required. Of those, an electron-transporting substance or a metal oxide is preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum. Of those, titanium oxide is preferably used.

A case in which the undercoat layer according to the present invention contains a polyamide resin and titanium oxide particles subjected to surface treatment is preferred.

From the viewpoint of the suppression of charge accumulation, the crystal structure of each of the titanium oxide particles is preferably a rutile type or an anatase type, and is more preferably a rutile type having weak photocatalytic activity. When the crystal structure is a rutile type, the rutilization ratio of the particles is preferably 90% or more. The shape of each of the titanium oxide particles is preferably a spherical shape, and an average primary particle diameter "b" [μm] thereof is preferably 0.006 or more and 0.180 or less, more preferably 0.015 or more and 0.085 or less from the viewpoints of the suppression of charge accumulation and uniform dispersibility. The titanium oxide particles are preferably subjected to surface treatment with a compound represented by the following formula (1).

(1)

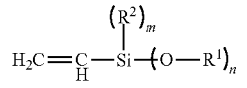

In the formula (1), $R^1$ represents a methyl group, an ethyl group, an acetyl group, or a 2-methoxyethyl group, $R^2$ represents a hydrogen atom or a methyl group, m+n=3, "m" represents an integer of 0 or more, and "n" represents an integer of 1 or more, provided that, when "n" represents 3, $R^2$ is absent.

Specifically, the titanium oxide particles are preferably subjected to surface treatment with at least one kind of compound selected from vinyltrimethoxysilane, vinyltriethoxysilane, and vinylmethyldimethoxysilane.

In the undercoat layer, a volume ratio between the titanium oxide particles and the polyamide resin (the volume of the titanium oxide particles to the volume of the polyamide resin) "a" is preferably 0.2 or more and 1.0 or less. When "a" is less than 0.2, a suppressive effect on the accumulation of a charge in the present invention is not sufficiently obtained, and when "a" is more than 1.0, a suppressive effect on the peeling of the photosensitive layers in the present invention is not sufficiently obtained. A more preferred range of "a" is 0.3 or more and less than 0.8.

In particular, in the case where the average primary particle diameter of the titanium oxide particles is represented by "b", when a/b satisfies the relational expression of the following expression (A) among preferred ranges of "a" and "b", two effects, i.e., the suppression of the peeling of the photosensitive layers and the suppression of the accumulation of a charge retained in the undercoat layer can both be achieved at high levels.

$$14.0 \leq a/b \leq 19.1 \qquad \text{Expression (A):}$$

In addition, the undercoat layer may further contain an additive.

The average thickness of the undercoat layer is preferably 0.1 μm or more and 50 μm or less, more preferably 0.2 μm or more and 40 μm or less, particularly preferably 0.3 μm or more and 30 μm or less.

The undercoat layer may be formed by preparing a coating liquid for an undercoat layer containing the above-mentioned materials and a solvent, forming a coating film thereof, and drying and/or curing the coating film. Examples of the solvent to be used for the coating liquid include an alcohol-based solvent, a ketone-based solvent, an ether-based solvent, an ester-based solvent, and an aromatic hydrocarbon-based solvent.

<Photosensitive Layers>

The photosensitive layers of the electrophotographic photosensitive member are preferably organic photosensitive layers. The photosensitive layers include a charge-generating layer and a charge-transporting layer.

(1-1) Charge-Generating Layer

The charge-generating layer preferably contains a charge-generating substance and a binder resin.

According to a preferred mode of the present invention, the charge-generating layer is arranged directly above the undercoat layer. The charge-generating layer of the present invention is obtained by: dispersing the charge-generating substance and as required, the binder resin in a solvent to prepare a coating liquid for a charge-generating layer; forming a coating film of the coating liquid for a charge-generating layer; and drying the coating film.

The average thickness of the charge-generating layer is preferably 0.10 μm or more and 1.00 μm or less, more preferably 0.15 μm or more and 0.40 μm or less, particularly preferably 0.20 μm or more and 0.30 μm or less.

The coating liquid for a charge-generating layer may be prepared as follows: only the charge-generating substance is added to the solvent, and the mixture is subjected to dispersion treatment; and then, the binder resin is added thereto. Alternatively, the coating liquid may be prepared by adding the charge-generating substance and the binder resin together to the solvent, and subjecting the mixture to dispersion treatment.

At the time of the dispersion, a medium-type disperser, such as a sand mill or a ball mill, or a disperser, such as a liquid collision-type disperser or an ultrasonic disperser, may be used.

Examples of the binder resin to be used for the charge-generating layer include resins (insulating resins), such as a polyvinyl butyral resin, a polyvinyl acetal resin, a polyarylate resin, a polycarbonate resin, a polyester resin, a polyvinyl acetate resin, a polysulfone resin, a polystyrene resin, a phenoxy resin, an acrylic resin, a phenoxy resin, a polyacrylamide resin, a polyvinylpyridine resin, a urethane resin, an agarose resin, a cellulose resin, a casein resin, a polyvinyl alcohol resin, a polyvinylpyrrolidone resin, a vinylidene chloride resin, an acrylonitrile copolymer, and a polyvinyl benzal resin. In addition, organic photoconductive polymers, such as poly-N-vinylcarbazole, polyvinylanthracene, and polyvinylpyrene, may also be used. In addition, the binder resins may be used alone or as a mixture or a copolymer thereof.

Examples of the solvent to be used for the coating liquid for a charge-generating layer include toluene, xylene, tetralin, chlorobenzene, dichloromethane, chloroform, trichloroethylene, tetrachloroethylene, carbon tetrachloride, methyl acetate, ethyl acetate, propyl acetate, methyl formate, ethyl formate, acetone, methyl ethyl ketone, cyclohexanone, diethyl ether, dipropyl ether, propylene glycol monomethyl ether, dioxane, methylal, tetrahydrofuran, water, methanol, ethanol, n-propanol, isopropanol, butanol, methyl cellosolve, methoxypropanol, dimethylformamide, dimethylacetamide, and dimethyl sulfoxide. In addition, the solvents may be used alone or as a mixture thereof.

Examples of the charge-generating substance to be used for the charge-generating layer include an azo pigment, a perylene pigment, a polycyclic quinone pigment, an indigo pigment, and a phthalocyanine pigment. Of those, a phthalocyanine pigment is preferred, and an oxytitanium phthalocyanine pigment and a hydroxygallium phthalocyanine pigment are more preferred. Those pigments may each have an axial ligand or a substituent.

Further, the hydroxygallium phthalocyanine pigment preferably includes crystal grains of a crystal form showing peaks at Bragg angles 2θ of 7.4°±0.3° and 28.2°±0.3° in an X-ray diffraction spectrum using a CuKα ray. In addition, the pigment preferably has a peak at from 20 nm to 50 nm in a crystal grain size distribution measured using small-angle X-ray scattering, and the half-width of the peak is preferably 50 nm or less.

Further, the hydroxygallium phthalocyanine pigment more preferably includes crystal grains each containing, in itself, an amide compound represented by the following formula (A1). Examples of the amide compound represented by the formula (A1) include N-methylformamide, N-propylformamide, and N-vinylformamide. Of those, N-methylformamide is preferred.

(A1)

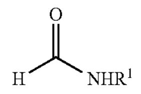

In the formula (A1), $R^1$ represents a methyl group, a propyl group, or a vinyl group.

In addition, the content of the amide compound represented by the formula (A1) to be incorporated into the crystal grains is preferably 0.1 mass % or more and 3.0 mass % or less, more preferably 0.1 mass % or more and 1.4 mass % or less with respect to the content of the crystal grains. When the content of the amide compound is 0.1 mass % or more and 3.0 mass % or less, the sizes of the crystal grains can be aligned to an appropriate size.

The phthalocyanine pigment containing the amide compound represented by the formula (A1) in each of its crystal grains is obtained through a step of subjecting a phthalocyanine pigment obtained by an acid pasting method and the amide compound represented by the formula (A1) to crystal conversion through wet milling treatment.

When a dispersant is used in the milling treatment, the amount of the dispersant is preferably from 10 to 50 times as large as that of the phthalocyanine pigment on a mass basis. In addition, examples of a solvent to be used include: amide-based solvents, such as N,N-dimethylformamide, N,N-dimethylacetamide, N-methylformamide, the compound represented by the formula (A1), N-methylacetamide, and N-methylpropionamide; halogen-based solvents such as chloroform; ether-based solvents such as tetrahydrofuran; and sulfoxide-based solvents such as dimethyl sulfoxide. Of those, N-methylformamide is preferably used. When N-methylformamide is used, the half-width of the peak of the crystal grain size distribution can be made sharp. In addition, the usage amount of the solvent is preferably from 5 to 30 times as large as that of the phthalocyanine pigment on a mass basis.

Whether or not the hydroxygallium phthalocyanine pigment contained, in each of its crystal grains, the amide compound represented by the formula (A1) was determined by analyzing the data of the $^1$H-NMR measurement of the resultant hydroxygallium phthalocyanine pigment. In addition, the content of the amide compound represented by the formula (A1) in the crystal grains was determined by the data analysis of the results of the $^1$H-NMR measurement. For example, when milling treatment, or a washing step after milling, with a solvent that can dissolve the amide compound represented by the formula (A1) is performed, the resultant hydroxygallium phthalocyanine pigment is subjected to the $^1$H-NMR measurement. When the amide compound represented by the formula (A1) is detected, it can be judged that the amide compound represented by the formula (A1) is incorporated into the crystal.

The powder X-ray diffraction measurement and $^1$H-NMR measurement of the phthalocyanine pigment to be incorporated into the electrophotographic photosensitive member of the present invention were performed under the following conditions.

(Powder X-Ray Diffraction Measurement)

Measurement device used: X-ray diffractometer RINT-TTR II, manufactured by Rigaku Corporation
X-ray tube: Cu
X-ray wavelength: Kα1
Tube voltage: 50 KV
Tube current: 300 mA
Scanning method: 2θ scan
Scanning speed: 4.0°/min
Sampling interval: 0.02°
Start angle 2θ: 5.0°
Stop angle 2θ: 35.0°
Goniometer: rotor horizontal goniometer (TTR-2)
Attachment: capillary rotating sample stage
Filter: not used
Detector: scintillation counter
Incident monochromator: used
Slit: variable slit (parallel beam method)
Counter monochromator: not used
Divergence slit: open
Divergence vertical limit slit: 10.00 mm
Scattering slit: open
Receiving slit: open ($^1$H-NMR Measurement)

Measuring instrument used: AVANCE III 500, manufactured by Bruker Corporation
Solvent: Deuterated sulfuric acid ($D_2SO_4$)
Number of scans: 2,000

(1-2) Charge-Transporting Layer

The charge-transporting layer preferably contains a charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % or more and 70 mass % or less, more preferably 30 mass % or more and 55 mass % or less with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the charge-transporting layer is preferably 5 μm or more and 50 μm or less, more preferably 8 μm or more and 40 μm or less, particularly preferably 10 μm or more and 30 μm or less.

The charge-transporting layer may be formed by preparing a coating liquid for a charge-transporting layer containing the above-mentioned materials and a solvent, forming a coating film thereof, and drying the coating film. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

<Protection Layer>

In the present invention, a protection layer may be arranged on the photosensitive layer. The arrangement of the protection layer can improve durability.

The protection layer preferably contains conductive particles and/or a charge-transporting substance, and a resin.

Examples of the conductive particles include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protection layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acryloyl group and a methacryloyl group. A material having a charge-transporting ability may be used as the monomer having a polymerizable functional group.

The protection layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the protection layer is preferably 0.5 μm or more and 10 μm or less, more preferably 1 μm or more and 7 μm or less.

The protection layer may be formed by preparing a coating liquid for a protection layer containing the above-mentioned materials and a solvent, forming a coating film thereof, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

Figure 2:
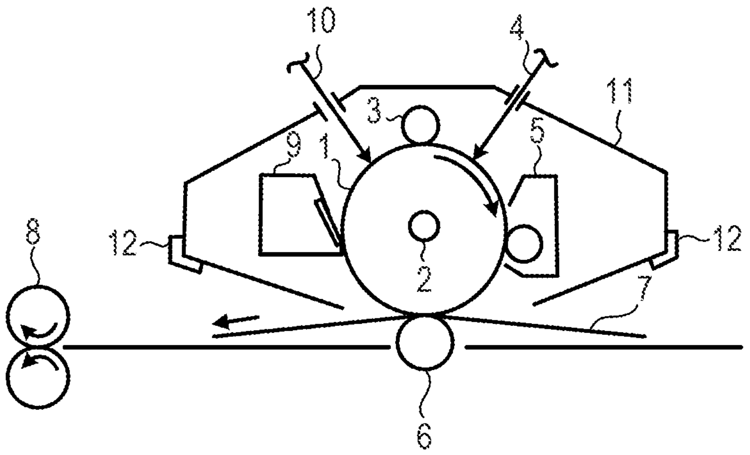
FIG. 2 is an illustration of an example of the schematic configuration of an electrophotographic apparatus including a process cartridge including an electrophotographic photosensitive member and a charging unit.

An example of the schematic configuration of an electrophotographic apparatus including a process cartridge including an electrophotographic photosensitive member is illustrated in FIG. 2. In FIG. 2, a cylindrical (drum-shaped) electrophotographic photosensitive member 1 is rotationally driven about a shaft 2 in a direction indicated by the arrow at a predetermined peripheral speed (process speed).

The surface of the electrophotographic photosensitive member 1 is charged to a predetermined positive or negative potential by a charging unit 3 in its rotation process. Next, exposure light 4 is applied from an image exposing unit (not shown) to the charged surface of the electrophotographic photosensitive member 1 to form an electrostatic latent image corresponding to target image information. The exposure light 4 is light, which is emitted from the image exposing unit, such as slit exposure or laser beam scanning exposure, and is subjected to intensity modulation in correspondence with a time-series electric digital image signal of the target image information.

The electrostatic latent image formed on the surface of the electrophotographic photosensitive member 1 is developed (normal development or reversal development) with toner stored in a developing unit 5 to form a toner image on the surface of the electrophotographic photosensitive member 1. The toner image formed on the surface of the electrophotographic photosensitive member 1 is transferred onto a transfer material 7 by a transferring unit 6. At this time, a bias voltage opposite in polarity to a charge retained by the toner is applied from a bias power source (not shown) to the transferring unit 6. In addition, when the transfer material 7 is paper, the transfer material 7 is removed from a sheet-feeding portion (not shown), and is fed into a space between the electrophotographic photosensitive member 1 and the transferring unit 6 in sync with the rotation of the electrophotographic photosensitive member 1.

The transfer material 7 onto which the toner image has been transferred from the electrophotographic photosensitive member 1 is separated from the surface of the electrophotographic photosensitive member 1, and is then conveyed to a fixing unit 8 where the transfer material is subjected to treatment for fixing the toner image. Thus, the transfer material is printed out as an image-formed product (a print or a copy) to the outside of the electrophotographic apparatus. The surface of the electrophotographic photosensitive member 1 after the transfer of the toner image onto the transfer material 7 is cleaned by a cleaning unit 9 as follows: a deposit such as the toner (transfer residual toner) is removed from the surface. The transfer residual toner may be directly removed with a developing device or the like by a cleaner-less system that has been developed in recent years. Further, the surface of the electrophotographic photosensitive member 1 is subjected to electricity-removing treatment by pre-exposure light 10 from a pre-exposing unit (not shown), and is then repeatedly used in image formation. When the charging unit 3 is a contact charging unit using a charging roller or the like, the pre-exposing unit is not necessarily required. In the present invention, a plurality of constituents out of the constituents, such as the electrophotographic photosensitive member 1, the charging unit 3, the developing unit 5, and the cleaning unit 9 described above, are stored in a container and integrally supported to form a process cartridge. The process cartridge may be removably mounted onto the main body of the electrophotographic apparatus. For example, at least one selected from the charging unit 3, the developing unit 5, and the cleaning unit 9 is integrally supported with the electrophotographic photosensitive member 1 to be turned into a cartridge. The cartridge may be a process cartridge 11 removably mounted onto the main body of the electrophotographic apparatus through use of a guiding unit 12 of the main body of the electrophotographic apparatus, such as a rail. When the electrophotographic apparatus is a copying machine or a printer, the exposure light 4 may be reflected light or transmitted light from a manuscript. Alternatively, the exposure light may be light to be radiated by, for example, scanning with a laser beam, the driving of a LED array, or the driving of a liquid crystal shutter array to be performed in accordance with a signal, which is obtained as follows: the manuscript is read with a sensor, and is turned into the signal.

The electrophotographic photosensitive member of the present invention can be widely applied to fields where electrophotography is applied, such as a laser beam printer, a CRT printer, a LED printer, a FAX, a liquid crystal printer, and laser plate making.

EXAMPLES

The present invention is described in more detail below by way of Examples and Comparative Examples. The present invention is by no means limited to the following Examples without departing from the gist of the present invention. In the description in the following Examples, “part(s)” is by mass unless otherwise specified.

The thicknesses of the respective layers of electrophotographic photosensitive members of Examples and Comparative Examples except a charge-generating layer were each determined by a method including using an eddy current-type thickness meter (Fischerscope, manufactured by Fischer Instruments K.K.) or a method including converting the mass of the layer per unit area into the thickness thereof through use of the specific gravity thereof. The thickness of the charge-generating layer was measured by converting the Macbeth density value of the photosensitive member, which has been measured by pressing a spectral densitometer (product name: X-Rite 504/508, manufactured by X-Rite Inc.) against the surface of the photosensitive member, through use of a calibration curve obtained in advance from the Macbeth density value and the value of the thickness measured by the observation of a sectional SEM image of the layer.

<Preparation of Coating Liquid 1 for Conductive Layer>

Anatase-type titanium oxide having an average primary particle diameter of 200 nm was used as a base, and a titanium-niobium sulfuric acid solution containing 33.7 parts of titanium in terms of $TiO_2$ and 2.9 parts of niobium in terms of $Nb_2O_5$ was prepared. 100 Parts of the base was dispersed in pure water to provide 1,000 parts of a suspension, and the suspension was warmed to 60° C. The titanium-niobium sulfuric acid solution and 10 mol/L sodium hydroxide were dropped into the suspension over 3 hours so that the pH of the suspension became from 2 to 3. After the total amount of the solutions had been dropped, the pH was adjusted to a value near a neutral region, and a polyacrylamide-based flocculant was added to the mixture to sediment a solid content. The supernatant was removed, and the residue was filtered and washed, followed by drying at 110° C. Thus, an intermediate containing 0.1 wt % of organic matter derived from the flocculant in terms of C was obtained. The intermediate was calcined in nitrogen at 750° C. for 1 hour, and was then calcined in air at 450° C. to produce titanium oxide particles.

Subsequently, 50 parts of a phenol resin (monomer/oligomer of a phenol resin) (product name: PLYOPHEN J-325, manufactured by DIC Corporation, resin solid content: 60%, density after curing: 1.3 g/cm$^3$) serving as a binding material was dissolved in 35 parts of 1-methoxy-2-propanol serving as a solvent to provide a solution.

60 Parts of titanium oxide particles 1 were added to the solution. The mixture was loaded into a vertical sand mill using 120 parts of glass beads having an average particle diameter of 1.0 mm as a dispersing medium, and was subjected to dispersion treatment under the conditions of a dispersion liquid temperature of 23° C.±3° C. and a number of revolutions of 1,500 rpm (peripheral speed: 5.5 m/s) for 4 hours to provide a dispersion liquid. The glass beads were removed from the dispersion liquid with a mesh. 0.01 Part of a silicone oil (product name: SH28 PAINT ADDITIVE, manufactured by Dow Corning Toray Co., Ltd.) serving as a leveling agent and 8 parts of silicone resin particles (product name: KMP-590, manufactured by Shin-Etsu Chemical Co., Ltd., average particle diameter: 2 m, density: 1.3 g/cm$^3$) serving as a surface roughness-imparting material were added to the dispersion liquid after the removal of the glass beads, and the mixture was stirred. The mixture was filtered under pressure with PTFE filter paper (product name: PF060, manufactured by Advantec Toyo Kaisha, Ltd.) to prepare a coating liquid 1 for a conductive layer.

<Preparation of Coating Liquid 2 for Conductive Layer>

214 Parts of titanium oxide ($TiO_2$) particles coated with oxygen-deficient tin oxide ($SnO_2$), the particles serving as metal oxide particles, 132 parts of a phenol resin (monomer/oligomer of a phenol resin) (product name: PLYOPHEN J-325, manufactured by Dainippon Ink and Chemicals, Incorporated, resin solid content: 60 mass %) serving as a binding material, and 98 parts of 1-methoxy-2-propanol serving as a solvent were loaded into a sand mill using 450 parts of glass beads each having a diameter of 0.8 mm, and were subjected to dispersion treatment under the conditions of a number of revolutions of 2,000 rpm, a dispersion treatment time of 4.5 hours, and a cooling water preset temperature of 18° C. to provide a dispersion liquid. The glass beads were removed from the dispersion liquid with a mesh (aperture: 150 μm). Silicone resin particles (product name: TOSPEARL 120, manufactured by Momentive Performance Materials, average particle diameter: 2 μm) serving as a surface roughness-imparting material were added to the dispersion liquid at 10 mass % with respect to the total mass of the metal oxide particles and the binding material in the dispersion liquid after the removal of the glass beads. In addition, a silicone oil (product name: SH28PA, manufactured by Dow Corning Toray Co., Ltd.) serving as a leveling agent was added to the dispersion liquid at 0.01 mass % with respect to the total mass of the metal oxide particles and the binding material in the dispersion liquid, and the mixture was stirred. Thus, a coating liquid 2 for a conductive layer was prepared.

<Preparation of Coating Liquid 1 for Undercoat Layer>

100 Parts of rutile-type titanium oxide particles (average primary particle diameter: 50 nm, manufactured by Tayca Corporation) were stirred and mixed with 500 parts of toluene, 3.5 parts of vinyltrimethoxysilane (product name: KBM-1003, manufactured by Shin-Etsu Chemical Co., Ltd.) was added, and the mixture was subjected to dispersion treatment in a vertical sand mill using glass beads each having a diameter of 1.0 mm for 8 hours. After the glass beads had been removed, toluene was removed by evaporation through vacuum distillation, and the residue was dried for 3 hours at 120° C. Thus, rutile-type titanium oxide particles surface-treated with the organosilicon compound were obtained.

18.0 Parts of the rutile-type titanium oxide particles surface-treated with the organosilicon compound, 4.5 parts of N-methoxymethylated nylon (product name: TORESIN EF-30T, manufactured by Nagase ChemteX Corporation), and 1.5 parts of a copolymer nylon resin (product name: AMILAN CM8000, manufactured by Toray Industries, Inc.) were added to a mixed solvent of 90 parts of methanol and 60 parts of 1-butanol to prepare a dispersion liquid.

The dispersion liquid was subjected to dispersion treatment in a vertical sand mill using glass beads each having a diameter of 1.0 mm for 5 hours, and the glass beads were removed. Thus, a coating liquid 1 for an undercoat layer was prepared. When the ratio of the volume of the titanium oxide particles to the volume of the resultant polyamide resin was represented by “a” and the average primary particle diameter of the titanium oxide particles was represented by “b” [μm], it was found that a/b=15.6. The value of “a” was calculated after the production of an electrophotographic photosensitive member from an area ratio in a micrograph taken of a cross-section of the electrophotographic photosensitive member through use of a field emission scanning electron microscope (FE-SEM, product name: S-4800, manufactured by Hitachi High-Technologies Corporation).

<Preparation of Coating Liquid 2 for Undercoat Layer>

4.5 Parts of N-methoxymethylated nylon (product name: TORESIN EF-30T, manufactured by Nagase ChemteX Corporation) and 1.5 parts of a copolymer nylon resin (product name: AMILAN CM8000, manufactured by Toray Industries, Inc.) were added to a mixed solvent of 90 parts of methanol and 45 parts of 1-butanol, and the mixture was stirred at 40° C. for 2 hours to prepare a coating liquid 2 for an undercoat layer.

<Preparation of Coating Liquid 3 for Undercoat Layer>

A coating liquid 3 for an undercoat layer was prepared in the same manner except that, in the preparation of the coating liquid 1 for an undercoat layer, the usage amount of the surface-treated rutile-type titanium oxide particles was changed from 18.0 parts to 22.0 parts. When the ratio of the volume of the titanium oxide particles to the volume of the resultant polyamide resin was represented by “a” and the average primary particle diameter of the titanium oxide particles was represented by “b” [μm], it was found that a/b=19.1.

<Preparation of Coating Liquid 4 for Undercoat Layer>

A coating liquid 4 for an undercoat layer was prepared in the same manner except that, in the preparation of the coating liquid 1 for an undercoat layer, the usage amount of the surface-treated rutile-type titanium oxide particles was changed from 18.0 parts to 20.8 parts, the usage amount of N-methoxymethylated nylon (product name: TORESIN EF-30T, manufactured by Nagase ChemteX Corporation) was changed from 4.5 parts to 3.9 parts, and the usage amount of the copolymer nylon resin (product name: AMILAN CM8000, manufactured by Toray Industries, Inc.) was changed from 1.5 parts to 1.3 parts. When the ratio of the volume of the titanium oxide particles to the volume of the resultant polyamide resin was represented by "a" and the average primary particle diameter of the titanium oxide particles was represented by "b" [μm], it was found that a/b=20.8.

<Preparation of Coating Liquid 5 for Undercoat Layer>

A coating liquid 5 for an undercoat layer was prepared in the same manner except that, in the preparation of the coating liquid 1 for an undercoat layer, the usage amount of the surface-treated rutile-type titanium oxide particles was changed from 18.0 parts to 15.0 parts. When the ratio of the volume of the titanium oxide particles to the volume of the resultant polyamide resin was represented by "a" and the average primary particle diameter of the titanium oxide particles was represented by "b" [μm], it was found that a/b=13.0.

<Preparation of Coating Liquid 6 for Undercoat Layer>

4.6 Parts of a compound represented by the formula (7) serving as an electron-transporting substance and 8.6 parts of a blocked isocyanate compound (product name: SBN-70D, manufactured by Asahi Kasei Corporation) were dissolved in a mixed solvent of 48 parts of 1-methoxy-2-propanol and 48 parts of tetrahydrofuran. Further, 0.3 part of silica particles (product name: RX200, manufactured by Nippon Aerosil Co., Ltd.) were added, and the mixture was stirred. Thus, a coating liquid 6 for an undercoat layer was prepared.

(7)

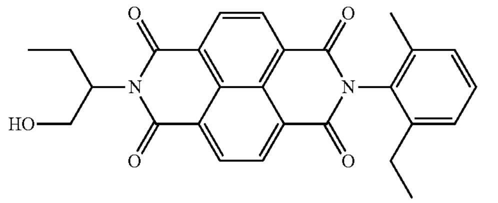

Synthesis of Phthalocyanine Pigment

Synthesis Example 1

Under a nitrogen flow atmosphere, 5.46 parts of o-phthalonitrile and 45 parts of α-chloronaphthalene were loaded into a reaction vessel. After that, the temperature of the mixture was increased to 30° C. by its heating, and the temperature was maintained. Next, 3.75 parts of gallium trichloride was loaded into the vessel at the temperature (30° C.). The moisture concentration of the mixed liquid at the time of the loading was 150 ppm. After that, the temperature was increased to 200° C. Next, under a nitrogen flow atmosphere, the resultant was subjected to a reaction at a temperature of 200° C. for 4.5 hours, and was then cooled. When the temperature reached 150° C., the product was filtered. The resultant filtration residue was dispersed in and washed with N,N-dimethylformamide at a temperature of 140° C. for 2 hours, and was then filtered. The resultant filtration residue was washed with methanol, and was then dried to provide a chlorogallium phthalocyanine pigment in a yield of 71%.

Synthesis Example 2

4.65 Parts of the chlorogallium phthalocyanine pigment obtained in Synthesis Example 1 above was dissolved in 139.5 parts of concentrated sulfuric acid at a temperature of 10° C. The solution was dropped into 620 parts of ice water under stirring to be reprecipitated. The precipitate was filtered under reduced pressure with a filter press. At this time, No. 5C (manufactured by Advantec) was used as a filter. The resultant wet cake (filtration residue) was dispersed in and washed with 2% ammonia water for 30 minutes, and was then filtered with the filter press. Next, the resultant wet cake (filtration residue) was dispersed in and washed with ion-exchanged water, and was then repeatedly filtered with the filter press three times. Finally, the resultant was freeze-dried to provide a hydroxygallium phthalocyanine pigment (water-containing hydroxygallium phthalocyanine pigment) having a solid content of 23% in a yield of 97%.

Synthesis Example 3

6.6 Kilograms of the hydroxygallium phthalocyanine pigment obtained in Synthesis Example 2 above was dried with a hyper-dry dryer (product name: HD-06R, frequency (oscillation frequency): 2,455 MHz±15 MHz, manufactured by Biocon (Japan) Ltd.) as described below.

The hydroxygallium phthalocyanine pigment was placed under the state of a lump (water-containing cake thickness: 4 cm or less) immediately after its removal from the filter press on a dedicated circular plastic tray, and the dryer was set so that far infrared rays were turned off, and the temperature of the inner wall of the dryer became 50° C. Then, when the pigment was irradiated with a microwave, the vacuum pump and leak valve of the dryer were adjusted to adjust the vacuum degree thereof to from 4.0 kPa to 10.0 kPa.

First, as a first step, the hydroxygallium phthalocyanine pigment was irradiated with a microwave having an output of 4.8 kW for 50 minutes. Next, the microwave was temporarily turned off, and the leak valve was temporarily closed to achieve a high vacuum of 2 kPa or less. The solid content of the hydroxygallium phthalocyanine pigment at this time point was 88%. As a second step, the leak valve was adjusted to adjust the vacuum degree (pressure in the dryer) within the above-mentioned preset values (from 4.0 kPa to 10.0 kPa). After that, the hydroxygallium phthalocyanine pigment was irradiated with a microwave having an output of 1.2 kW for 5 minutes. In addition, the microwave was temporarily turned off, and the leak valve was temporarily closed to achieve a high vacuum of 2 kPa or less. The second step was repeated once more (twice in total). The solid content of the hydroxygallium phthalocyanine pigment at this time point was 98%. Further, as a third step, microwave irradiation was performed in the same manner as in the second step except that the output of the microwave in the second step was changed from 1.2 kW to 0.8 kW. The third step was repeated once more (twice in total). Further, as a fourth step, the leak valve was adjusted to return the vacuum degree (pressure in the dryer) within the above-mentioned preset values (from 4.0 kPa to 10.0 kPa). After that, the hydroxygallium phthalocyanine pigment was irradiated with a microwave having an output of 0.4 kW for 3 minutes. In addition, the microwave was temporarily turned off, and the leak valve was temporarily closed to achieve a high vacuum of 2 kPa or less. The fourth step was repeated seven more times (eight times in total). Thus, 1.52 kg of a hydroxygallium phthalocyanine pigment (crystal) having a water content of 1% or less was obtained within a total of 3 hours.

Synthesis Example 4

In 1,000 g of α-chloronaphthalene, 50 g of o-phthalodinitrile and 20 g of titanium tetrachloride were heated and stirred at 200° C. for 3 hours, and were then cooled to 50° C. to precipitate a crystal. The crystal was separated by filtration to provide a paste of dichlorotitanium phthalocyanine. Next, the paste was stirred and washed with 1,000 mL of N,N-dimethylformamide heated to 100° C., and was then washed repeatedly twice with 1,000 mL of methanol at 60° C. and separated by filtration. Further, the resultant paste was stirred at 80° C. for 1 hour in 1,000 mL of deionized water, and was separated by filtration to provide 43 g of a blue titanyl phthalocyanine pigment.

Next, the pigment was dissolved in 300 mL of concentrated sulfuric acid. The solution was dropped into 3,000 mL of deionized water at 20° C. under stirring to be reprecipitated. The precipitate was filtered and sufficiently washed with water to provide an amorphous titanyl phthalocyanine pigment. 40 Grams of the amorphous titanyl phthalocyanine pigment was suspended and stirred in 1,000 mL of methanol at room temperature (22° C.) for 8 hours. The resultant was separated by filtration and dried under reduced pressure to provide a titanyl phthalocyanine pigment having low crystallinity.

Synthesis Example 5

Under a nitrogen flow atmosphere, 100 g of gallium trichloride and 291 g of o-phthalonitrile were added to 1,000 mL of α-chloronaphthalene, and the mixture was subjected to a reaction at a temperature of 200° C. for 24 hours. After that, the product was filtered. The resultant wet cake was stirred in N,N-dimethylformamide under heating at a temperature of 150° C. for 30 minutes, and then the mixture was filtered. The resultant filtration residue was washed with methanol, and was then dried to provide a chlorogallium phthalocyanine pigment in a yield of 83%.

20 Grams of the chlorogallium phthalocyanine pigment obtained by the above-mentioned method was dissolved in 500 mL of concentrated sulfuric acid, and the solution was stirred for 2 hours. After that, the solution was dropped into a mixed solution of 1,700 mL of distilled water and 660 mL of concentrated ammonia water, which had been cooled with ice, to be reprecipitated. The precipitate was sufficiently washed with distilled water, and was dried to provide a hydroxygallium phthalocyanine pigment.

<Preparation of Coating Liquid 1 for Charge-Generating Layer>

0.5 Part of the hydroxygallium phthalocyanine pigment obtained in Synthesis Example 3, 9.5 parts of N-methylformamide (product code: F0059, manufactured by Tokyo Chemical Industry Co., Ltd.), and 15 parts of glass beads each having a diameter of 0.9 mm were subjected to milling treatment with a sand mill (BSG-20, manufactured by IMEX Co., Ltd.) at room temperature (23° C.) for 100 hours. At this time, the treatment was performed under such a condition that a disc rotated 1,500 times per minute. The thus treated liquid was filtered through a filter (product number: N-NO.125T, pore diameter: 133 μm, manufactured by NBC Meshtec Inc.) to remove the glass beads. 30 Parts of N-methylformamide was added to the resultant liquid, the mixture was then filtered, and the product collected by filtration on the filter apparatus was sufficiently washed with tetrahydrofuran. Then, the washed product collected by filtration was vacuum-dried to provide 0.46 part of a hydroxygallium phthalocyanine pigment. The resultant pigment contained N-methylformamide.

The resultant pigment has peaks at Bragg angles 2θ° of 7.5°±0.2°, 9.9°±0.2°, 16.2°±0.2°, 18.6°±0.2°, 25.2°±0.2°, and 28.3°±0.2° in an X-ray diffraction spectrum using a CuKα ray.

Subsequently, 20 parts of the hydroxygallium phthalocyanine pigment obtained in the milling treatment, 10 parts of polyvinyl butyral (product name: S-LEC BX-1, manufactured by Sekisui Chemical Co., Ltd.), 190 parts of cyclohexanone, and 482 parts of glass beads each having a diameter of 0.9 mm were subjected to dispersion treatment with a sand mill (K-800, manufactured by Igarashi Machine Production Co., Ltd. (currently changed to IMEX Co., Ltd.), disc diameter: 70 mm, number of discs: 5) under a cooling water temperature of 18° C. for 4 hours. At this time, the treatment was performed under such a condition that the discs rotated 1,800 times per minute. The glass beads were removed from the resultant dispersion liquid, and 444 parts of cyclohexanone and 634 parts of ethyl acetate were added. Thus, a coating liquid 1 for a charge-generating layer was prepared.

<Preparation of Coating Liquid 2 for Charge-Generating Layer>

A coating liquid 2 for a charge-generating layer was prepared in the same manner as the coating liquid 1 for a charge-generating layer except that, in the preparation of the coating liquid 1 for a charge-generating layer, the step of obtaining the hydroxygallium phthalocyanine pigment was changed as described below.

0.5 Part of the hydroxygallium phthalocyanine pigment obtained in Synthesis Example 5, 7.5 parts of N,N-dimethylformamide (product code: D0722, manufactured by Tokyo Chemical Industry Co., Ltd.), and 29 parts of glass beads each having a diameter of 0.9 mm were subjected to milling treatment under a temperature of 25° C. for 24 hours through use of a sand mill (BSG-20, manufactured by IMEX Co., Ltd.). In this case, the treatment was performed under such a condition that a disc rotated 1,500 times per minute. The thus treated liquid was filtered through a filter (product number: N-NO.125T, pore diameter: 133 m, manufactured by NBC Meshtec Inc.) to remove the glass beads. 30 Parts of N,N-dimethylformamide was added to the resultant liquid, the mixture was then filtered, and the product collected by filtration on the filter apparatus was sufficiently washed with n-butyl acetate. Then, the washed product collected by filtration was vacuum-dried to provide 0.45 part of a hydroxygallium phthalocyanine pigment. The resultant pigment contained N,N-dimethylformamide.

<Preparation of Coating Liquid 1 for Charge-Transporting Layer>

3.6 Parts of a triarylamine compound represented by the following formula (CTM-1):

(CTM-1)

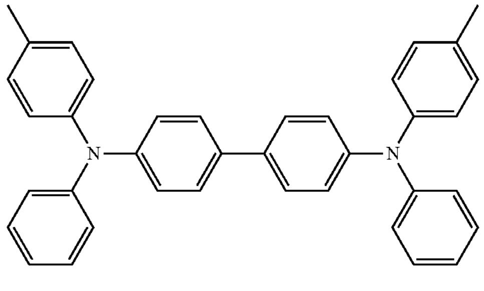

and 5.4 parts of a triarylamine compound represented by the following formula (CTM-2), the compounds serving as charge-transporting substances:

(CTM-2)

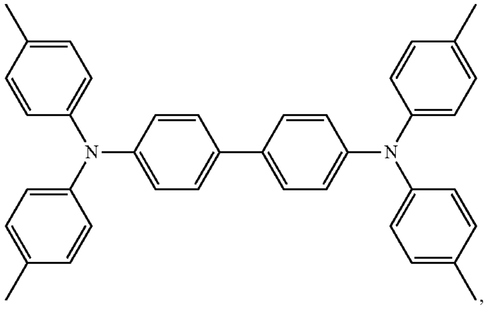

and 10 parts of a polycarbonate resin (product name: Iupilon Z-400, manufactured by Mitsubishi Engineering-Plastics Corporation) were dissolved in a mixed solvent of 25 parts of o-xylene, 25 parts of methyl benzoate, and 25 parts of dimethoxymethane. Thus, a coating liquid 1 for a charge-transporting layer was prepared.

<Preparation of Coating Liquid 2 for Charge-Transporting Layer>

9 Parts of a triphenylamine compound represented by the following formula (CTM-3) serving as a charge-transporting substance:

(CTM-3)

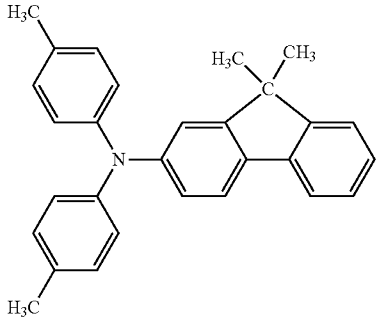

and 10 parts of a polyarylate resin having a structural unit represented by the following formula (3-1) and a structural unit represented by the following formula (3-2) at a ratio of 5/5, and having a weight-average molecular weight of 100,000 were dissolved in a mixed solvent of 30 parts of dimethoxymethane and 70 parts of chlorobenzene. Thus, a coating liquid 2 for a charge-transporting layer was prepared.

(3-1)

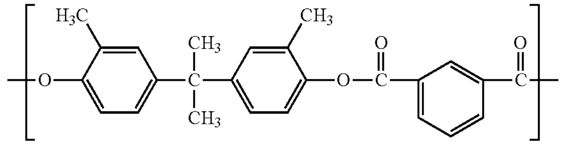

(3-2)

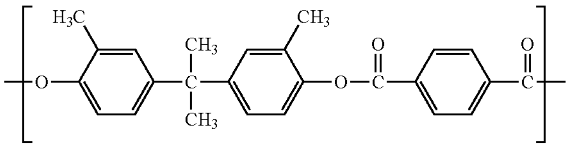

<Preparation of Coating Liquid 3 for Charge-Transporting Layer>

A coating liquid 3 for a charge-transporting layer was prepared in the same manner as the coating liquid 1 for a charge-transporting layer except that, in the preparation of the coating liquid 1 for a charge-transporting layer, the polycarbonate resin was changed to the polyarylate resin having the structural unit represented by (3-1) and the structural unit represented by (3-2) at a ratio of 5/5, and having a weight-average molecular weight of 100,000.

<Preparation of Coating Liquid 4 for Charge-Transporting Layer>

10 Parts of a charge-transporting substance represented by the following structural formula (CTM-4) serving as a charge-transporting substance and 10 parts of polycarbonate (product name: Iupilon Z-400, manufactured by Mitsubishi Engineering-Plastics Corporation) were dissolved in a mixed solvent of 50 parts of o-xylene/25 parts of THF. Thus, a coating liquid 4 for a charge-transporting layer was prepared.

(CTM-4)

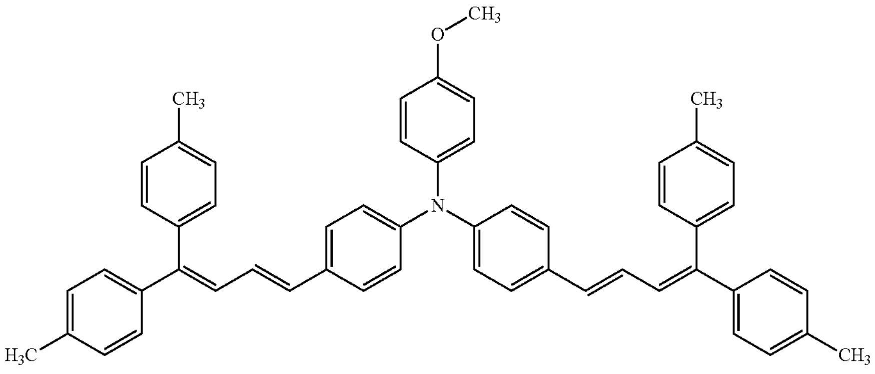

<Preparation of Coating Liquid 5 for Charge-Transporting Layer>

10 Parts of a charge-transporting substance represented by the following structural formula (CTM-5) serving as a charge-transporting substance:

(CTM-5)

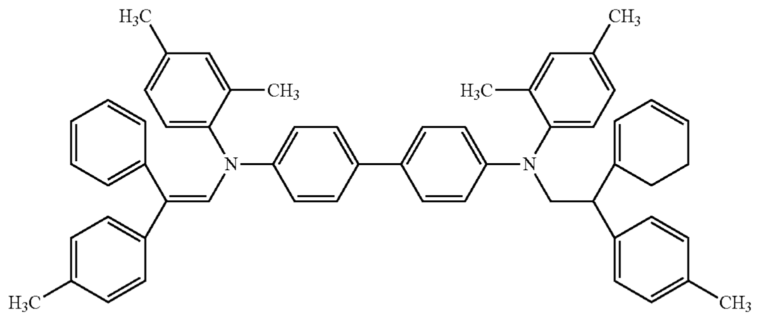

and 10 parts of polycarbonate (product name: Iupilon Z-400, manufactured by Mitsubishi Engineering-Plastics Corporation) were dissolved in a mixed solvent of 25 parts of o-xylene/25 parts of methyl benzoate/25 parts of dimethoxymethane. Thus, a coating liquid 5 for a charge-transporting layer was prepared.

<Preparation of Coating Liquid 6 for Charge-Transporting Layer>

A coating liquid 6 for a charge-transporting layer was prepared in the same manner as the coating liquid 1 for a charge-transporting layer except that, in the preparation of the coating liquid 1 for a charge-transporting layer, 3.6 parts of the triarylamine compound represented by (CTM-1) and 5.4 parts of the triarylamine compound represented by (CTM-2) were changed to 9 parts of the triarylamine compound represented by (CTM-1).

<Preparation of Coating Liquid 7 for Charge-Transporting Layer>

A coating liquid 7 for a charge-transporting layer was prepared in the same manner as the coating liquid 6 for a charge-transporting layer except that, in the preparation of the coating liquid 6 for a charge-transporting layer, the triarylamine compound represented by (CTM-1) was changed to the triarylamine compound represented by (CTM-2).

<Preparation of Coating Liquid 8 for Charge-Transporting Layer>

A coating liquid 8 for a charge-transporting layer was prepared in the same manner as the coating liquid 4 for a charge-transporting layer except that, in the preparation of the coating liquid 4 for a charge-transporting layer, the polycarbonate resin was changed to the polyarylate resin having the structural unit represented by (3-1) and the structural unit represented by (3-2) at a ratio of 5/5, and having a weight-average molecular weight of 100,000.

<Preparation of Coating Liquid 9 for Charge-Transporting Layer>

A coating liquid 9 for a charge-transporting layer was prepared in the same manner as the coating liquid 5 for a charge-transporting layer except that, in the preparation of the coating liquid 5 for a charge-transporting layer, the polycarbonate resin was changed to the polyarylate resin having the structural unit represented by (3-1) and the structural unit represented by (3-2) at a ratio of 5/5, and having a weight-average molecular weight of 100,000.

<Preparation of Coating Liquid 10 for Charge-Transporting Layer>

A coating liquid 10 for a charge-transporting layer was prepared in the same manner as the coating liquid 6 for a charge-transporting layer except that, in the preparation of the coating liquid 6 for a charge-transporting layer, the polycarbonate resin was changed to the polyarylate resin having the structural unit represented by (3-1) and the structural unit represented by (3-2) at a ratio of 5/5, and having a weight-average molecular weight of 100,000.

<Preparation of Coating Liquid 11 for Charge-Transporting Layer>

A coating liquid 11 for a charge-transporting layer was prepared in the same manner as the coating liquid 7 for a charge-transporting layer except that, in the preparation of the coating liquid 7 for a charge-transporting layer, the polycarbonate resin was changed to the polyarylate resin having the structural unit represented by (3-1) and the structural unit represented by (3-2) at a ratio of 5/5, and having a weight-average molecular weight of 100,000.

<Production of Electrophotographic Photosensitive Member>

A support, a conductive layer, an undercoat layer, a charge-generating layer, and a charge-transporting layer were produced by the following methods.

Example 1

<Support>

An aluminum cylinder having a diameter of 24 mm and a length of 257 mm was used as a support (cylindrical support).

<Conductive Layer>

The coating liquid 1 for a conductive layer was applied onto the above-mentioned support by dip coating to form a coating film, and the coating film was cured by heating at 150° C. for 30 minutes to form a conductive layer having a thickness of 22 μm.

<Undercoat Layer>

The coating liquid 1 for an undercoat layer was applied onto the above-mentioned conductive layer by dip coating to form a coating film, and the coating film was cured by heating at 100° C. for 10 minutes to form an undercoat layer having a thickness of 1.2 μm.

<Charge-Generating Layer>

The coating liquid 1 for a charge-generating layer was applied onto the above-mentioned undercoat layer by dip coating to form a coating film, and the coating film was dried by heating at a temperature of 100° C. for 10 minutes to form a charge-generating layer having a thickness of 0.20 μm.

<Charge-Transporting Layer>

The coating liquid 1 for a charge-transporting layer was applied onto the above-mentioned charge-generating layer by dip coating to form a coating film, and the coating film was dried by heating at a temperature of 120° C. for 30 minutes to form a charge-transporting layer having a thickness of 21 μm.

Examples 2 to 34

Electrophotographic photosensitive members 2 to 34 were produced in the same manner as in Example 1 except that, in Example 1, the coating liquid for a conductive layer and the thickness of the conductive layer, the coating liquid for an undercoat layer and the thickness of the undercoat layer, the coating liquid for a charge-generating layer and the thickness of the charge-generating layer, and the coating liquid for a charge-transporting layer and the thickness of the charge-transporting layer were changed as shown in Table 1.

TABLE 1

| Example | Coating liquid for conductive layer No. | Thickness of conductive layer (μm) | Coating liquid for undercoat layer No. | Thickness of undercoat layer (μm) | Coating liquid for charge-generating layer No. | Thickness of charge-generating layer (μm) | Coating liquid for charge-transporting layer No. | Thickness of charge-transporting layer (μm) |
|---|---|---|---|---|---|---|---|---|
| Example 1 | 1 | 22 | 1 | 1.2 | 1 | 0.20 | 1 | 21 |
| Example 2 | 1 | 22 | 1 | 1.2 | 1 | 0.20 | 1 | 35 |
| Example 3 | 1 | 22 | 1 | 1.2 | 1 | 0.25 | 1 | 21 |
| Example 4 | 1 | 22 | 1 | 1.2 | 1 | 0.25 | 1 | 28 |
| Example 5 | 1 | 22 | 1 | 1.2 | 1 | 0.25 | 1 | 35 |
| Example 6 | 1 | 22 | 1 | 1.2 | 1 | 0.30 | 1 | 21 |
| Example 7 | 1 | 22 | 1 | 1.2 | 1 | 0.30 | 1 | 35 |
| Example 8 | 1 | 22 | 1 | 1.2 | 1 | 0.25 | 2 | 28 |
| Example 9 | 1 | 22 | 1 | 1.2 | 1 | 0.20 | 2 | 21 |
| Example 10 | 1 | 22 | 1 | 1.2 | 1 | 0.35 | 1 | 28 |
| Example 11 | 1 | 22 | 1 | 1.2 | 1 | 0.20 | 3 | 21 |
| Example 12 | 1 | 22 | 1 | 1.2 | 1 | 0.20 | 3 | 28 |
| Example 13 | 1 | 22 | 1 | 1.2 | 1 | 0.20 | 3 | 35 |
| Example 14 | 1 | 22 | 1 | 1.2 | 1 | 0.22 | 3 | 28 |
| Example 15 | 1 | 22 | 1 | 1.2 | 1 | 0.25 | 3 | 28 |
| Example 16 | 1 | 22 | 1 | 1.2 | 1 | 0.20 | 4 | 21 |
| Example 17 | 1 | 22 | 1 | 1.2 | 1 | 0.20 | 4 | 28 |
| Example 18 | 1 | 22 | 1 | 1.2 | 1 | 0.20 | 4 | 35 |
| Example 19 | 1 | 22 | 1 | 1.2 | 1 | 0.20 | 5 | 21 |
| Example 20 | 1 | 22 | 1 | 1.2 | 1 | 0.20 | 5 | 28 |
| Example 21 | 1 | 22 | 1 | 1.2 | 1 | 0.20 | 5 | 35 |
| Example 22 | 1 | 22 | 1 | 1.2 | 1 | 0.20 | 6 | 21 |
| Example 23 | 1 | 22 | 1 | 1.2 | 1 | 0.20 | 6 | 35 |
| Example 24 | 1 | 22 | 1 | 1.2 | 1 | 0.20 | 7 | 21 |
| Example 25 | 1 | 22 | 1 | 1.2 | 1 | 0.20 | 7 | 35 |
| Example 26 | 1 | 22 | 1 | 1.2 | 1 | 0.20 | 8 | 35 |
| Example 27 | 1 | 22 | 1 | 1.2 | 1 | 0.20 | 9 | 35 |
| Example 28 | 1 | 22 | 1 | 1.2 | 1 | 0.20 | 10 | 35 |
| Example 29 | 1 | 22 | 1 | 1.2 | 1 | 0.20 | 11 | 35 |
| Example 30 | 1 | 22 | 2 | 0.8 | 1 | 0.20 | 1 | 21 |
| Example 31 | 2 | 30 | 2 | 0.8 | 1 | 0.20 | 1 | 23 |
| Example 32 | 1 | 22 | 3 | 1.2 | 1 | 0.20 | 1 | 35 |
| Example 33 | 1 | 22 | 4 | 1.2 | 1 | 0.20 | 1 | 35 |
| Example 34 | 1 | 22 | 5 | 1.2 | 1 | 0.20 | 1 | 35 |

coating film, and the coating film was cured by heating at 160° C. for 40 minutes to form a conductive layer having a thickness of 30 μm.

<Undercoat Layer>

The coating liquid 6 for an undercoat layer was applied onto the conductive layer by dip coating, and the resultant coating film was polymerized by heating at 170° C. for 20 minutes to form an undercoat layer having a thickness of 0.7 μm.

<Charge-Generating Layer>

The coating liquid 2 for a charge-generating layer was applied onto the above-mentioned undercoat layer by dip coating to form a coating film, and the coating film was dried by heating at a temperature of 100° C. for 10 minutes to form a charge-generating layer having a thickness of 0.20 μm.

<Charge-Transporting Layer>

The coating liquid 2 for a charge-transporting layer was applied onto the above-mentioned charge-generating layer by dip coating to form a coating film, and the coating film Comparative Example 1

An electrophotographic photosensitive member was produced by the following methods.

<Support>

An aluminum cylinder having a diameter of 24 mm and a length of 257 mm was used as a support (cylindrical support).

<Conductive Layer>

The coating liquid 2 for a conductive layer was applied onto the above-mentioned support by dip coating to form a was dried by heating at a temperature of 120° C. for 30 minutes to form a charge-transporting layer having a thickness of 21 μm.

Comparative Example 2

50 Parts of titanium oxide powder coated with tin oxide containing 10% of antimony oxide, 25 parts of a resol-type phenol resin, 20 parts of methyl cellosolve, 5 parts of methanol, and 0.002 part of a silicone oil (polydimethylsiloxane-polyoxyalkylene copolymer, average molecular weight: 3,000) were dispersed in a sand mill using 1 mmφ glass beads for 2 hours to prepare a coating liquid 3 for a conductive layer.

The coating liquid 3 for a conductive layer was applied onto an aluminum cylinder (φ24 mm, length: 257 mm) by dip coating, and was dried at 140° C. for 30 minutes to form a conductive layer having a thickness of 15 μm.

A coating liquid 7 for an undercoat layer obtained by dissolving 5 parts of a 6-66-610-12 quaternary polyamide copolymer in a mixed solvent of 70 parts of methanol and 25 parts of butanol was applied onto the conductive layer by dip coating, and was dried to form an undercoat layer having a thickness of 0.7 μm.

Next, 2 parts of a hydroxygallium phthalocyanine crystal having strong peaks at Bragg angles 2θ±0.2° of 7.5°, 9.9°, 16.3°, 18.6°, 25.10, and 28.3° in CuKα characteristic X-ray diffraction was mixed with a resin solution obtained by dissolving 1 part of a polyvinyl butyral resin (product name: S-LEC BX-1, manufactured by Sekisui Chemical Co., Ltd.) in 19 parts of cyclohexanone, and the mixture was dispersed in a sand mill using glass beads each having a diameter of 1 mm for 3 hours to prepare a dispersion liquid, and the glass beads were removed. The resultant liquid was diluted by adding 69 parts of cyclohexanone and 132 parts of ethyl acetate thereto to prepare a coating material 3 for a charge-generating layer. The coating material 3 for a charge-generating layer was applied onto the undercoat layer by dip coating, and was dried at 100° C. for 10 minutes to form a charge-generating layer having a thickness of 0.12 μm.

Next, 8 parts of the charge-transporting substance having the triphenylamine structure represented by the structural formula (CTM-3) and 10 parts of a polyarylate resin (viscosity-average molecular weight: 100,000) having a repeating structural unit represented by the following structural formula (3-3) were dissolved in 60 parts of chlorobenzene to prepare a coating liquid 12 for a charge-transporting layer. The coating liquid 12 for a charge-transporting layer was applied onto the charge-generating layer by dip coating, and was dried at 120° C. for 60 minutes to form a charge-transporting layer having a thickness of 11 μm. Thus, an electrophotographic photosensitive member of Comparative Example 2 was produced.

(3-3)

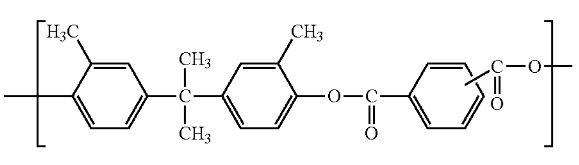

Comparative Example 3

The following photosensitive layers were formed on a φ24 mm aluminum substrate to produce an electrophotographic photosensitive member of Comparative Example 3.

<Undercoat Layer>

30 Parts of a titanium chelate compound (TC-750: manufactured by Matsumoto Chemical Industry Co., Ltd.), 17 parts of a silane coupling agent (KBM-503 manufactured by Shin-Etsu Chemical Co., Ltd.), and 117 parts of 2-propanol were mixed to produce a coating liquid 8 for an undercoat layer. The coating liquid 8 for an undercoat layer was applied onto the above-mentioned conductive support of a cylindrical shape by dip coating, and was dried to produce an undercoat layer having a thickness of 1.0 μm.

<Charge-Generating Layer>

60 Parts of Y-type titanyl phthalocyanine (titanyl phthalocyanine having a maximum peak at an X-ray diffraction angle 2θ with a Cu-Kα characteristic X-ray of 27.3°), 700 parts of a silicone resin solution (KR5240, 15% xylene-butanol solution: manufactured by Shin-Etsu Chemical Co., Ltd.), and 1,610 parts of 2-butanone were mixed, and dispersed using a sand mill for 10 hours to prepare a coating liquid 4 for a charge-generating layer. The coating liquid was applied onto the undercoat layer by a dip coating method to form a charge-generating layer having a dry thickness of 0.2 μm.

<Charge-Transporting Layer>

300 Parts of a charge-transporting substance (4-methoxy-4'-(4-methyl-α-phenylstyryl)triphenylamine), 300 parts of bisphenol Z-type polycarbonate (Iupilon Z300: manufactured by Mitsubishi Gas Chemical Company, Inc.), 10 parts of tin oxide fine particles, and 2,000 parts of dioxolane were mixed and dissolved to prepare a coating liquid 13 for a charge-transporting layer. The coating liquid 13 for a charge-transporting layer was applied onto the charge-generating layer by a dip coating method to form a charge-transporting layer having a dry thickness of 20 μm.

Comparative Example 4

An electrophotographic photosensitive member of Comparative Example 4 was produced in the same manner as in Comparative Example 1 except that the undercoat layer and the charge-transporting layer were changed as described below.

<Undercoat Layer>

The coating liquid 2 for an undercoat layer was applied onto the conductive layer by dip coating, and the resultant coating film was polymerized by heating at 100° C. for 10 minutes to form an undercoat layer having a thickness of 0.8 μm.

<Charge-Transporting Layer>

The coating liquid 2 for a charge-transporting layer was applied onto the above-mentioned charge-generating layer by dip coating at a lower coating speed than that in Comparative Example 1 to form a coating film, and the coating film was dried by heating at a temperature of 120° C. for 30 minutes to form a charge-transporting layer having a thickness of 17 μm.

Comparative Example 5

An electrophotographic photosensitive member of Comparative Example 5 was produced in the same manner as in Comparative Example 4 except that, in the production of the charge-generating layer, the coating liquid used was changed to the coating liquid 1 for a charge-generating layer, and a charge-generating layer having a thickness of 0.2 μm was formed.

Comparative Example 6

Type IV titanyl phthalocyanine and polyvinyl butyral (BX-55, Sekisui Chemical Co., Ltd.) were mixed at a weight ratio of 45/55 in a mixture of 2-butanone and cyclohexanone to prepare a coating liquid 5 for a charge-generating layer. Type IV titanyl phthalocyanine has strong peaks at Bragg angles 2θ of 9.6±0.2°, 24.0±0.2°, and 27.2±0.2° in an X-ray diffraction spectrum using a CuKα ray. An aluminum cylinder having a diameter of 24 mm and a length of 257 mm was subjected to dip coating with this liquid, followed by drying at 100° C. for 15 minutes to produce a charge-generating layer having a thickness of 0.25 μm.

27.0 Parts of p-(diethylamino)benzaldehyde diphenylhydrazone (DEH), 37.9 parts of bisphenol-A (Bayer AG), and 0.48 part of acetosol yellow were mixed into a solvent mixture of tetrahydrofuran and 1,4-dioxane to prepare a coating liquid 14 for a charge-transporting layer. The above-mentioned charge-generating layer was subjected to dip coating with this liquid, followed by drying at 100° C. for 60 minutes to form a charge-transporting layer. Thus, an electrophotographic photosensitive member of Comparative Example 6 was produced.

Comparative Example 7

An electrophotographic photosensitive member of Comparative Example 7 was produced in the same manner as in Comparative Example 5 except that, in the production of the charge-generating layer, a coating liquid 6 for a charge-generating layer obtained by mixing type IV titanyl phthalocyanine and type I titanyl phthalocyanine at a weight ratio of 67/33 in place of type IV titanyl phthalocyanine was used. Type I titanyl phthalocyanine has strong peaks at Bragg angles 2θ of 7.6±0.2°, 25.3±0.2°, and 28.6±0.2° in an X-ray diffraction spectrum using a CuKα ray.

Comparative Example 8

<Support>

An aluminum cylinder having a diameter of 24 mm and a length of 257 mm was used as a support (cylindrical support).

<Undercoat Layer>

The coating liquid 1 for an undercoat layer was applied onto the above-mentioned conductive layer by dip coating to form a coating film, and the coating film was cured by heating at 100° C. for 10 minutes to form an undercoat layer having a thickness of 1.2 μm.

<Charge-Generating Layer>

0.45 Part of IUPILON 200, polycarbonate of poly(4,4'-diphenyl)-1,1'-cyclohexane carbonate (PCZ-200, available from Mitsubishi Gas Chemical Company, Inc.), and 56 parts of tetrahydrofuran were loaded into a 4-ounce glass bottle to prepare a dispersion for a charge-generating layer. 2.4 Parts of hydroxygallium phthalocyanine type V and 300 parts of stainless-steel shots each having a diameter of 3.2 mm were added to the above-mentioned solution. Then, the mixture was placed in a ball mill for about 24 hours. Then, 2.25 parts of poly(4,4'-diphenyl-1,1'-cyclohexane carbonate) having a weight-average molecular weight of 20,000 (PCZ-200) was dissolved in 46.1 parts of tetrahydrofuran, and then the solution was added to the above-mentioned hydroxygallium phthalocyanine slurry. Then, 300 parts of the resultant slurry and 450 parts of glass beads each having a diameter of 0.9 mm were placed in a sand mill (K-800, manufactured by Igarashi Machine Production Co., Ltd. (currently IMEX Co., Ltd.), disc diameter: 70 mm, number of discs: 5), and dispersion treatment was performed for 10 minutes. In this case, the treatment was performed under such a condition that the discs rotated 1,800 times per minute. The glass beads were removed from the resultant dispersion liquid, and thus a coating liquid 7 for a charge-generating layer was prepared. This liquid was applied onto the above-mentioned undercoat layer by dip coating, and was dried at 125° C. for 2 minutes to form a charge-generating layer having a thickness of 0.7 μm.

<Charge-Transporting Layer>

5 Parts of the triarylamine compound represented by (CTM-2) and 5 parts of PCZ-400 (trademark) (known polycarbonate resin having an average molecular weight of about 40,000, and being commercially available from Mitsubishi Gas Chemical Company, Inc.) were dissolved in tetrahydrofuran to produce a coating liquid 15 for a charge-transporting layer containing 34 wt % of solids. The coating liquid 15 for a charge-transporting layer was applied onto the charge-generating layer by dip coating to form a coating film, and the coating film was dried by heating at a temperature of 120° C. for 30 minutes to form a charge-transporting layer having a thickness of 30 μm. Thus, an electrophotographic photosensitive member of Comparative Example 8 was produced.

Comparative Example 9

100 Parts by mass of zinc oxide (average particle diameter: 70 nm, trial product manufactured by Tayca Corporation, specific surface area value: 15 $m^2/g$) was stirred and mixed with 500 parts by mass of toluene. 1.25 Parts by mass of a silane coupling agent (KBM603, manufactured by Shin-Etsu Chemical Co., Ltd.) was added, and the mixture was stirred for 2 hours. After that, toluene was removed by evaporation through vacuum distillation, and the residue was baked at 150° C. for 2 hours to provide a surface-treated zinc oxide pigment.

38 Parts by mass of a solution obtained by dissolving 60 parts by mass of the surface-treated zinc oxide, 13.5 parts by mass of a curing agent (blocked isocyanate, Sumidur 3175, manufactured by Sumitomo Bayer Urethane Co., Ltd.), and 15 parts by mass of a butyral resin (BM-1, manufactured by Sekisui Chemical Co., Ltd.) in 85 parts by mass of methyl ethyl ketone was mixed with 25 parts by mass of methyl ethyl ketone, and the mixture was dispersed in a sand mill using 1 mmφ glass beads for 2 hours to provide a dispersion liquid. To the resultant dispersion liquid, 0.005 part by mass of dioctyltin dilaurate serving as a catalyst and 3.4 parts by mass of silicone resin particles (TOSPEARL 130, manufactured by GE Toshiba Silicone Co., Ltd.) were added to provide a coating liquid 9 for an undercoat layer. The coating liquid was applied onto an aluminum base material having a diameter of 24 mm and a length of 257 mm by a dip coating method, and was dried and cured at 170° C. for 40 minutes to provide an undercoat layer having a thickness of 25 μm.

Next, a mixture formed of 15 parts by mass of hydroxygallium phthalocyanine having diffraction peaks at positions of at least 7.3°, 16.0°, 24.9°, and 28.0° in terms of Bragg angles (2θ±0.2°) in an X-ray diffraction spectrum using a Cuka ray, the hydroxygallium phthalocyanine serving as a charge-generating substance, 10 parts by mass of a vinyl chloride/vinyl acetate copolymer resin (VMCH, manufactured by Union Carbide Corporation) serving as a binder resin, and 200 parts by mass of n-butyl acetate was dispersed in a sand mill using 1 mmφ glass beads for 4 hours to provide a dispersion liquid. To the resultant dispersion liquid, 175 parts by mass of n-butyl acetate and 180 parts by mass of methyl ethyl ketone were added, and the mixture was stirred to provide a coating liquid 8 for a charge-generating layer. The coating liquid was applied onto the undercoat layer by dip coating, and was dried at normal temperature to form a charge-generating layer having a thickness of 0.2 μm.

Next, 4 parts by mass of N,N'-diphenyl-N,N'-bis(3-methylphenyl)-[1,1']biphenyl-4,4'-diamine and 6 parts by mass of a bisphenol Z polycarbonate resin (viscosity-average molecular weight: 40,000) were added to and dissolved in 80 parts by mass of tetrahydrofuran to provide a coating liquid 16 for a charge-transporting layer. The coating liquid was applied onto the charge-generating layer by dip coating, and was dried at 115° C. for 40 minutes to form a charge-transporting layer having a thickness of 30 μm. Thus, an electrophotographic photosensitive member of Comparative Example 9 was produced.

Comparative Example 10

5 Parts of metal-free phthalocyanine, 100 parts of a hole-transporting agent represented by the structural formula (CTM-6), 30 parts of an electron-transporting agent represented by the structural formula (CTM-7), 100 parts of polycarbonate (product name: Iupilon Z-400, manufactured by Mitsubishi Engineering-Plastics Corporation), and 800 parts of tetrahydrofuran were mixed and dispersed with a paint shaker to produce a coating liquid 9 for a charge-generating layer. The coating liquid was applied onto an aluminum element tube, and was then dried with hot air at 130° C. for 30 minutes to form a charge-generating layer having a thickness of 38 μm. Thus, an electrophotographic photosensitive member of Comparative Example 10 was produced.

(CTM-6)

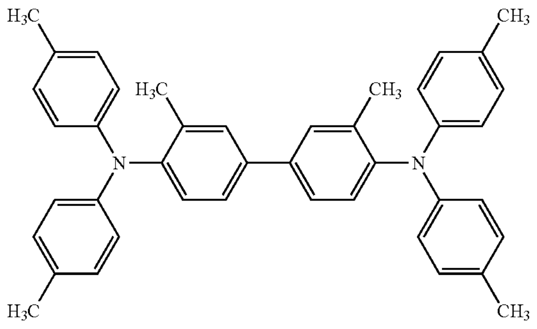

(CTM-7)

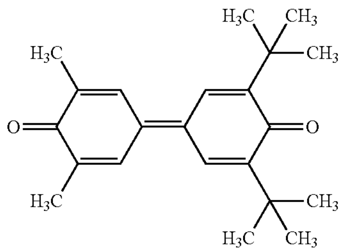

Comparative Example 11

The outer peripheral surface of an aluminum cylinder having a diameter of 24 mm and a length of 257 mm was cut with a diamond bit along its circumferential direction to form a rough surface having a pitch of 100 μm and a depth of 7 μm.

Next, 1 part of a trisazo pigment represented by the following structural formula (CGM-1), 0.5 part of a phenoxy resin (PKHH; manufactured by Union Carbide Corporation), and 0.5 part of a polyvinyl butyral resin (BX-1; manufactured by Sekisui Chemical Co., Ltd.) were dispersed together with 500 parts of cyclohexanone through use of a sand mill for 24 hours, and the resultant dispersion liquid of the trisazo compound was diluted with 500 parts of 1,4-dioxane to produce a coating liquid 10 for a charge-generating layer. The coating liquid was applied onto the aluminum cylinder by dip coating, and was dried to form a charge-generating layer having a thickness of 0.2 μm.

(CGM-1)

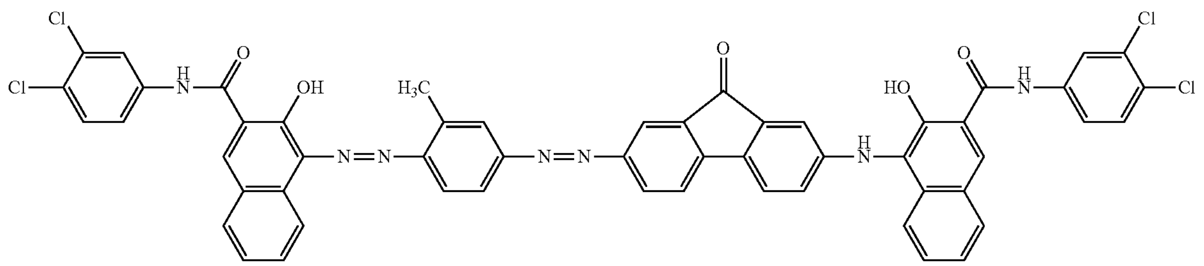

Next, 50 parts of a diamino compound represented by the structural formula (CTM-8), 50 parts of bisphenol Z-type polycarbonate, 1.5 parts of a dicyano compound represented by the structural formula (CTM-9), and 4 parts of di-ter-butylhydroxytoluene were dissolved in dichloromethane to produce a coating liquid 17 for a charge-transporting layer.

The coating liquid was applied onto the charge-generating layer by dip coating, and was dried to form a charge-transporting layer having a thickness of 35 μm. Thus, an electrophotographic photosensitive member of Comparative Example 11 was produced.

(CTM-8)

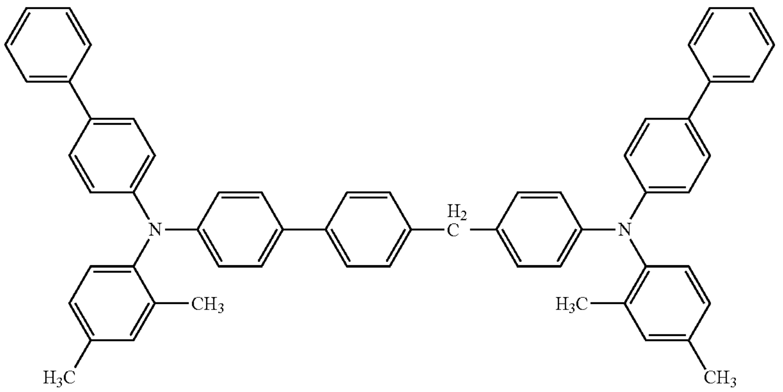

(CTM-9)

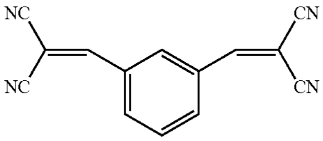

Comparative Example 12

An electrophotographic photosensitive member of Comparative Example 12 was produced in the same manner as in Example 1 except that, in Example 1, the coating liquid 1 for a charge-generating layer was changed to the coating liquid 5 for a charge-generating layer, and the thickness of the charge-generating layer was changed to 0.29 μm.

Comparative Example 13

An electrophotographic photosensitive member of Comparative Example 13 was produced in the same manner as in Comparative Example 12 except that, in the production of Comparative Example 12, the coating liquid 1 for an undercoat layer was changed to the coating liquid 2 for an undercoat layer, and the thickness of the undercoat layer was changed to 0.8 μm.

The coating liquid for a conductive layer and the thickness of the conductive layer, the coating liquid for an undercoat layer and the thickness of the undercoat layer, the coating liquid for a charge-generating layer and the thickness of the charge-generating layer, and the coating liquid for a charge-transporting layer and the thickness of the charge-transporting layer in the production of each of Comparative Example 1 to Comparative Example 13 described above are shown in Table 2.

TABLE 2

| Example | Coating liquid for conductive layer No. | Thickness of conductive layer (μm) | Coating liquid for undercoat layer No. | Thickness of undercoat layer (μm) | Coating liquid for charge-generating layer No. | Thickness of charge-generating layer (μm) | Coating liquid for charge-transporting layer No. | Thickness of charge-transporting layer (μm) |
|---|---|---|---|---|---|---|---|---|
| Comparative Example 1 | 2 | 30 | 6 | 0.7 | 2 | 0.20 | 2 | 21 |

TABLE 2-continued

| Example | Coating liquid for conductive layer No. | Thickness of conductive layer (μm) | Coating liquid for undercoat layer No. | Thickness of undercoat layer (μm) | Coating liquid for charge-generating layer No. | Thickness of charge-generating layer (μm) | Coating liquid for charge-transporting layer No. | Thickness of charge-transporting layer (μm) |
|---|---|---|---|---|---|---|---|---|
| Comparative Example 2 | 3 | 15 | 7 | 0.7 | 3 | 0.12 | 12 | 11 |
| Comparative Example 3 | — | — | 8 | 1 | 4 | 0.20 | 13 | 20 |
| Comparative Example 4 | 2 | 30 | 2 | 0.8 | 2 | 0.20 | 2 | 17 |
| Comparative Example 5 | 2 | 30 | 2 | 0.8 | 1 | 0.20 | 2 | 17 |
| Comparative Example 6 | — | — | — | — | 5 | 0.25 | 14 | 21 |
| Comparative Example 7 | — | — | — | — | 6 | 0.25 | 14 | 21 |
| Comparative Example 8 | — | — | 1 | 1.2 | 7 | 0.70 | 15 | 30 |
| Comparative Example 9 | — | — | 9 | 2.5 | 8 | 0.20 | 16 | 30 |
| Comparative Example 10 | — | — | — | — | 9 | 38.00 | — | — |
| Comparative Example 11 | — | — | — | — | 10 | 0.20 | 17 | 35 |
| Comparative Example 12 | 1 | 22 | 1 | 1.2 | 5 | 0.29 | 1 | 21 |
| Comparative Example 13 | 1 | 22 | 2 | 0.8 | 5 | 0.29 | 1 | 21 |

[Evaluations]

The following evaluations were performed for each of the photosensitive members of Examples and Comparative Examples described above. The results are shown in Table 3.

[Measurement of EV Curve]

The EV curve of each photosensitive member was measured in accordance with the EV curve evaluation method for an electrophotographic photosensitive member described above. That is, in a graph that is obtained at a temperature of 23.5 [° C.] and a relative humidity of 50 [% RH] in accordance with <Method of measuring EV Curve> with the measurement apparatus of FIG. 5, and that has a horizontal axis representing $I_{exp}$ and a vertical axis representing $V_{exp}$, when $V_{exp}$ at $I_{exp}$=0.500 [μJ/cm$^2$] in the graph is represented by $V=V_r$ [V], a maximum value of S [V·μJ/cm$^2$] represented by $S=I_{exp}\cdot(V_{exp}-V_r)$ in a range of $I_{exp}$=0.000 to 0.030 [μJ/cm$^2$] in the graph is represented by $S_{max}$ [V·μJ/cm$^2$], and a product of a light amount $I_i$ [μJ/cm$^2$] on the horizontal axis and a potential $V_i$[V] on the vertical axis at a point of intersection between an approximate straight line in a range of $I_{exp}$=0.000 to 0.010 [μJ/cm$^2$] and an approximate straight line in a range of $I_{exp}$=0.490 to 0.500 [μJ/cm$^2$] in the graph is represented by $S_i=I_i\cdot(V_i-V_r)$ [V·μJ/cm$^2$], a ratio AR of $S_i$ to $S_{max}=S_i/S_{max}$ is calculated.

<Method of Measuring EV Curve>

(1): A surface potential of the electrophotographic photosensitive member is set to 0 [V].

(2): Charging of the electrophotographic photosensitive member is performed for 0.005 second so that an absolute value of an initial surface potential thereof becomes $V_0$ [V].

(3): After 0.02 second from start of the charging, the electrophotographic photosensitive member after the charging is continuously exposed to light having a wavelength of 805 [nm] and an intensity of 25 [mW/cm$^2$] for "t" second(s) so as to achieve an exposure amount of $I_{exp}$ [μJ/cm$^2$].

(4): After 0.06 second from the start of the charging, an absolute value of a surface potential of the electrophotographic photosensitive member after the exposure is measured and represented by $V_{exp}$ [V].

(5): The operations (1) to (4) are repeated while changing $I_{exp}$ from 0.000 [μJ/cm$^2$] to 1.000 [μJ/cm$^2$] at intervals of 0.001 [μJ/cm$^2$], to thereby obtain $V_{exp}$ corresponding to each $I_{exp}$.

(6): In the operations (1) to (5), $V_{exp}$ [V] at t=0 and $I_{exp}$=0.000 [μJ/cm$^2$] in the operation (3) is particularly called a charged potential $V_d$ [V], and $V_0$ [V] in the operation (2) is set so that $V_d$ [V] takes a value of 300 V.

$S_{max}$, $S_i$, AR, $VR_{max}-V_r$, $I_{max}$, $LR_{max}$, and $V_r$ obtained by the above-mentioned method are shown in Table 3.

[Area Gradation Image Evaluation]

A laser beam printer manufactured by Hewlett-Packard Company (product name: Color Laser Jet Enterprise M653dn) was prepared as an electrophotographic apparatus for evaluation. A motor thereof configured to rotationally drive a photosensitive drum and the like was modified to rotate at 100 rpm. Further, the printer was modified so as to be able to regulate and measure a voltage applied to a charging roller, a developing voltage, and a pre-exposure amount and an image exposure amount for the photosensitive member. In addition, a modification was made so that the spot diameter (1/e$^2$ diameter) of an exposure laser became 50 μm.

In addition, three process cartridges of each of Examples and Comparative Examples were prepared. Each process cartridge was to be mounted only onto a process cartridge station for a magenta color, and hence was made operable without the mounting of process cartridges for the other colors (cyan, yellow, and black) onto the main body of the laser beam printer.

In the output of an image, the process cartridge for a magenta color mounted with a produced electrophotographic photosensitive member was mounted onto the main body of the laser beam printer, and the voltage applied to the charging roller was set so to achieve a dark portion potential of −350 V under a normal-temperature and normal-humidity environment (temperature: 23° C., relative humidity: 50%). Subsequently, a surface potential at the time of application of image exposure at a light amount of 0.500 [μJ/cm$^2$] was measured and represented by $V_{rr}$ [V], an image exposure amount at which the surface potential became $(-350-V_{rr})/2$ [V] was determined, and then a light amount 5 times as high as the image exposure amount was set as an image exposure amount for evaluation. Further, an exposure potential at the image exposure amount for evaluation (hereinafter referred to as "light portion potential") was represented by $V_{ll}$ [V], and a voltage for evaluation applied to the charging roller was set so that the dark portion potential took a value calculated by $V_{dd}=(-350+V_{ll})$ [V]. $V_{dd}$ at this time is referred to as dark portion potential for evaluation. In addition, the pre-exposure amount was set to be 3 times as high as the image exposure amount for evaluation. For the measurement of the surface potential of the photosensitive member at the time of potential setting, a potential probe (product name: model 6000B-8, manufactured by Trek Japan) mounted at the development position of the process cartridge was used, and a surface potentiometer (product name: model 344, manufactured by Trek Japan) was used.

In the above-mentioned method, the dark portion potential for evaluation and the image exposure amount for evaluation were set for each of the electrophotographic photosensitive members of Examples and Comparative Examples to be evaluated. With such settings, the effect of a surface potential that remains even after irradiation with sufficiently intense light (hereinafter referred to as "residual potential") can be removed to fix the absolute value of the potential difference contrast between the dark portion potential and the light portion potential at 350 [V] for each electrophotographic photosensitive member. In addition, at the same time, the variation amount of the exposure potential in the case where the image exposure amount for evaluation is varied on the EV curve can also be made uniform among all the electrophotographic photosensitive members to be evaluated. Accordingly, analog gradation properties can be evaluated under a state in which digital gradation properties are made uniform among all the electrophotographic photosensitive members to be evaluated.

After that, the resolution power of the output image was evaluated based on an area gradation image using a line growth dither pattern having a number of lines of 300 at a resolution of 600 dpi.

For the area gradation image (halftone image), gradation data equally divided into 17 stages was used. In this case, the gradation stages were defined by assigning each tone of the gradation a number with the densest tone of the gradation being assigned 16 and the palest tone of the gradation being assigned 0.

Of the obtained output images, output images of the respective stages of the gradation were visually identified, and ranks were given by the following criteria in accordance with the results of the images. Evaluation criteria A to C were defined as exhibiting the effect of the present invention. The results of the evaluation are shown in Table 3.

A: A stagewise density change can be visually recognized for the entire gradation from 1 to 15.

B: A stagewise density change can be visually recognized for the gradation from 2 to 14, but cannot be visually recognized for any other gradation.

C: A stagewise density change can be visually recognized for the gradation from 3 to 12 or from 4 to 13, or both thereof, but cannot be visually recognized for any other gradation.

D: A stagewise density change can be visually recognized only for the gradation from 5 to 12 or part thereof.

TABLE 3

| | $S_i$ | $S_{max}$ | AR | $V_{max} - V_r$ | $I_{max}$ | $LR_{max}$ | $V_r$ | Halftone image rank |
|---|---|---|---|---|---|---|---|---|
| Example No. | | | | | | | | |
| 1 | 0.702 | 10.8 | 0.065 | 141 | 0.085 | 1,664 | 14.8 | B |
| 2 | 0.483 | 6.5 | 0.075 | 141 | 0.051 | 2,774 | 18.2 | A |
| 3 | 0.710 | 8.0 | 0.088 | 138 | 0.064 | 2,161 | 12.9 | A |
| 4 | 0.710 | 8.0 | 0.088 | 138 | 0.064 | 2,161 | 15.3 | A |
| 5 | 0.597 | 6.4 | 0.093 | 139 | 0.051 | 2,722 | 17.1 | B |
| 6 | 0.898 | 10.9 | 0.082 | 138 | 0.087 | 1,591 | 12.7 | B |
| 7 | 0.617 | 6.6 | 0.094 | 139 | 0.052 | 2,674 | 16.9 | B |
| 8 | 0.650 | 7.4 | 0.088 | 85 | 0.088 | 966 | 53.0 | B |
| 9 | 0.730 | 8.5 | 0.086 | 163 | 0.072 | 2,264 | 45.0 | B |
| 10 | 0.650 | 7.1 | 0.091 | 152 | 0.052 | 2,929 | 18.2 | B |
| 11 | 0.863 | 10.4 | 0.083 | 140 | 0.082 | 1,704 | 12.9 | B |
| 12 | 0.702 | 7.8 | 0.090 | 141 | 0.061 | 2,308 | 14.6 | A |
| 13 | 0.589 | 6.2 | 0.094 | 140 | 0.049 | 2,864 | 15.3 | B |
| 14 | 0.710 | 8.0 | 0.088 | 138 | 0.064 | 2,161 | 12.9 | A |
| 15 | 0.733 | 8.2 | 0.089 | 139 | 0.065 | 2,138 | 12.7 | A |
| 16 | 0.269 | 4.4 | 0.061 | 152 | 0.036 | 4,218 | 30.7 | A |
| 17 | 0.211 | 3.3 | 0.064 | 152 | 0.027 | 5,624 | 31.8 | A |
| 18 | 0.174 | 2.6 | 0.066 | 150 | 0.022 | 6,800 | 33.5 | A |
| 19 | 0.325 | 5.7 | 0.057 | 149 | 0.048 | 3,102 | 31.0 | A |
| 20 | 0.257 | 4.3 | 0.060 | 149 | 0.036 | 4,136 | 33.4 | A |
| 21 | 0.213 | 3.4 | 0.062 | 148 | 0.029 | 5,107 | 33.9 | A |
| 22 | 0.860 | 10.2 | 0.084 | 140 | 0.078 | 1,799 | 9.4 | B |
| 23 | 0.586 | 6.1 | 0.096 | 140 | 0.047 | 2,974 | 12.3 | B |
| 24 | 0.869 | 10.8 | 0.080 | 136 | 0.083 | 1,644 | 6.1 | B |
| 25 | 0.594 | 6.5 | 0.092 | 136 | 0.050 | 2,720 | 9.2 | B |
| 26 | 0.267 | 4.3 | 0.062 | 155 | 0.035 | 4,429 | 32.2 | A |
| 27 | 0.323 | 5.6 | 0.058 | 151 | 0.047 | 3,215 | 35.2 | A |
| 28 | 0.858 | 10.1 | 0.085 | 142 | 0.077 | 1,840 | 10.3 | B |
| 29 | 0.867 | 10.7 | 0.081 | 136 | 0.083 | 1,639 | 6.9 | B |
| 30 | 1.302 | 13.7 | 0.095 | 156 | 0.128 | 1,219 | 48.6 | C |
| 31 | 1.244 | 12.6 | 0.099 | 156 | 0.117 | 1,333 | 50.3 | C |
| 32 | 0.480 | 6.2 | 0.077 | 129 | 0.050 | 2,580 | 20.7 | A |

TABLE 3-continued

| | $S_i$ | $S_{max}$ | AR | $V_{max} - V_r$ | $I_{max}$ | $LR_{max}$ | $V_r$ | Halftone image rank |
|---|---|---|---|---|---|---|---|---|
| 33 | 0.450 | 5.8 | 0.078 | 145 | 0.051 | 2,843 | 25.3 | B |
| 34 | 0.500 | 5.8 | 0.086 | 147 | 0.051 | 2,882 | 28.2 | B |
| Comparative Example No. | | | | | | | | |
| 1 | 0.954 | 7.3 | 0.131 | 175 | 0.102 | 1,711 | 103.2 | D |
| 2 | 4.865 | 12.7 | 0.384 | 177 | 0.162 | 1,091 | 98.4 | D |
| 3 | 2.263 | 5.1 | 0.442 | 206 | 0.067 | 3,068 | 129.0 | D |
| 4 | 4.867 | 13.3 | 0.365 | 159 | 0.155 | 1,028 | 73.5 | D |
| 5 | 4.867 | 13.3 | 0.365 | 159 | 0.155 | 1,028 | 73.5 | D |
| 6 | 1.241 | 11.3 | 0.110 | 147 | 0.116 | 1,270 | 49.9 | D |
| 7 | 1.523 | 11.6 | 0.132 | 146 | 0.119 | 1,226 | 48.5 | D |
| 8 | 0.638 | 6.1 | 0.105 | 152 | 0.084 | 1,806 | 79.7 | D |
| 9 | 0.714 | 4.2 | 0.171 | 178 | 0.066 | 2,693 | 114.6 | D |
| 10 | 0.494 | 2.6 | 0.193 | 198 | 0.055 | 3,608 | 151.9 | D |
| 11 | 7.229 | 14.7 | 0.493 | 200 | 0.190 | 1,053 | 123.0 | D |
| 12 | 1.687 | 8.2 | 0.205 | 151 | 0.086 | 1,759 | 55.6 | D |
| 13 | 2.565 | 11.5 | 0.223 | 167 | 0.123 | 1,360 | 73.7 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-130212, filed Aug. 6, 2021, which is hereby incorporated by reference herein in its entirety.

What is claimed is:

1. An electrophotographic photosensitive member, comprising:

a support;

a charge-generating layer formed on the support; and a charge-transporting layer formed on the charge-generating layer;

the electrophotographic photosensitive member being an organic photosensitive member;

the charge-generating layer containing a hydroxygallium phthalocyanine pigment, the hydroxygallium phthalocyanine pigment containing (i) crystal grains of a crystal form showing peaks at Bragg angles 2θ of 7.4°±0.3° and 28.2°±0.3° in an X-ray diffraction spectrum using a CuKα ray, and (ii) N-methylformamide; and the charge-transporting layer contains a triarylamine compound represented by (CTM-1) and a triarylamine compound represented by (CTM-2) as charge-transporting substances (CTM-1)

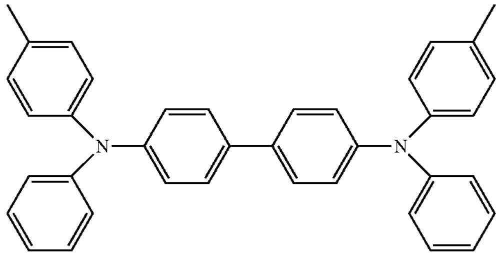

-continued (CTM-2)

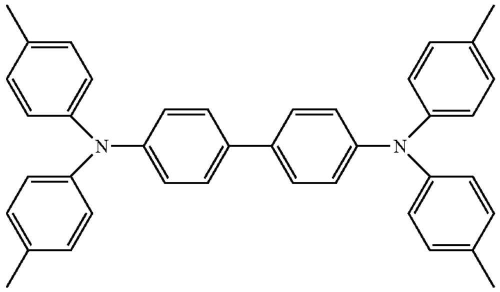

wherein, in an EV curve graph that is obtained at a temperature of 23.5 [° C.] and a relative humidity of 50 [% RH] having a horizontal axis representing $I_{exp}$ and a vertical axis representing $V_{exp}$, when $V_r$ [V] is $V_{exp}$ at $I_{exp}$=0.500 [μJ/cm$^2$], $S_{max}$ [V·μJ/cm$^2$] is a maximum value of $S=I_{exp}\cdot(V_{exp}-V_r)$ in a range of $I_{exp}$=0.000 to 0.030 [μJ/cm$^2$], $S_i=I_i\cdot(V_i-V_r)$ [V·μJ/cm$^2$] is a product of a light amount $I_i$ [μJ/cm$^2$] on the horizontal axis and a potential $V_i$ [V] on the vertical axis at a point of intersection between an approximate straight line in a range of $I_{exp}$=0.000 to 0.010 [μJ/cm$^2$] and an approximate straight line in a range of $I_{exp}$=0.490 to 0.500 [μJ/cm$^2$], and AR≤0.10 when AR is $S_i/S_{max}$, and $V_r$ [V] satisfies $V_r$≤30, and the EV curve is measured by steps comprising (1) setting a surface potential of the electrophotographic photosensitive member to 0 [V];

(2) charging the electrophotographic photosensitive member for 0.005 second so that an absolute value of an initial surface potential of the electrophotographic photosensitive member becomes $V_0$ [V];

(3) after 0.02 second from start of the charging, continuously exposing the electrophotographic photosensitive member to light having a wavelength of 805 [nm] and an intensity of 25 [mW/cm$^2$] for "t" second(s) so as to achieve an exposure amount of $I_{exp}$ [μJ/cm$^2$];

(4): after 0.06 second from the start of the charging, measuring an absolute value of a surface potential of the electrophotographic photosensitive member after the exposure which is represented by $V_{exp}$ [V];

(5) repeating operations (1) to (4) while changing $I_{exp}$ from 0.000 [μJ/cm$^2$] to 1.000 [μJ/cm$^2$] at intervals of 0.001 [μJ/cm$^2$], in order to obtain $V_{exp}$ [V] corresponding to each $I_{exp}$; and (6) $V_{exp}$ [V] at t=0 and $I_{exp}$=0.000 [μJ/cm$^2$] in operation (3) is a charged potential $V_d$ [V], and the $V_0$ [V] in operation (2) is set such that $V_d$ [V] is 300 V.

2. The electrophotographic photosensitive member according to claim 1, wherein AR≤0.09.

3. The electrophotographic photosensitive member according to claim 1, wherein $LR_{max}$≥2,000 when $V_{exp}$ and $I_{exp}$ at a time when the S becomes $S_{max}$ are respectively represented by $V_{max}$ and $I_{max}$, and $(V_{max}-V_r)/I_{max}$ is represented by $LR_{max}$.

4. The electrophotographic photosensitive member according to claim 3, wherein $LR_{max}$23,000.

5. The electrophotographic photosensitive member according to claim 1, further comprising an undercoat layer formed between the support and the charge-generating layer;

the undercoat layer comprises a polyamide resin, and titanium oxide particles subjected to surface treatment with a compound represented by formula (1)

(1)

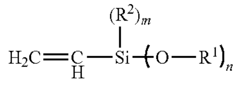

when $R^1$ represents a methyl group, an ethyl group, an acetyl group or a 2-methoxyethyl group, $R^2$ represents a hydrogen atom or a methyl group, m+n=3, m is an integer of 0 or more, and n is an integer of 1 or more, wherein 14.0≤a/b≤19.1 (A) when a is a ratio of a volume of the titanium oxide particles to a volume of the polyamide resin in the undercoat layer and b [μm] is an average primary particle diameter of the titanium oxide particles.

6. A process cartridge, comprising:

an electrophotographic photosensitive member; and at least one member selected from the group consisting of a charging unit, a developing unit and a cleaning unit;

the process cartridge integrally supporting the electrophotographic photosensitive member and the at least one member, and being removably mounted onto a main body of an electrophotographic apparatus the electrophotographic photosensitive member comprising a support, a charge-generating layer formed on the support, and a charge-transporting layer formed on the charge-generating layer;

the electrophotographic photosensitive member being an organic photosensitive member;

the charge-generating layer containing a hydroxygallium phthalocyanine pigment, the hydroxygallium phthalocyanine pigment containing (i) crystal grains of a crystal form showing peaks at Bragg angles 2θ of 7.4°±0.3° and 28.2°±0.3° in an X-ray diffraction spectrum using a CuKα ray, and (ii)N-methylformamide; and the charge-transporting layer contains a triarylamine compound represented by (CTM-1) and a triarylamine compound represented by (CTM-2) as charge-transporting substances (CTM-1)

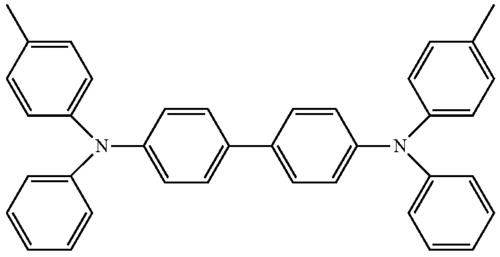

(CTM-2)

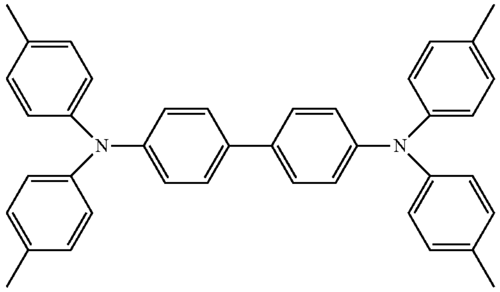

wherein, in an EV curve graph that is obtained at a temperature of 23.5 [° C.] and a relative humidity of 50 [% RH] having a horizontal axis representing $I_{exp}$ and a vertical axis representing $V_{exp}$, when $V_r$ [V] is $V_{exp}$ at $I_{exp}$=0.500 [μJ/cm$^2$], $S_{max}$ [V·μJ/cm$^2$] is a maximum value of $S=I_{exp}\cdot(V_{exp}-V_r)$ in a range of $I_{exp}$=0.000 to 0.030 [μJ/cm$^2$], $S_i=I_i\,(V_i-V_r)$ [V·μJ/cm$^2$] is a product of a light amount $I_i$ [μJ/cm$^2$] on the horizontal axis and a potential $V_i$ [V] on the vertical axis at a point of intersection between an approximate straight line in a range of $I_{exp}$=0.000 to 0.010 [μJ/cm$^2$] and an approximate straight line in a range of $I_{exp}$=0.490 to 0.500 [μJ/cm$^2$], and AR≤0.10 when AR is $S_i/S_{max}$, and $V_r$ [V] satisfies $V_r$≤30, and the EV curve is measured by steps comprising (1) setting a surface potential of the electrophotographic photosensitive member to 0 [V];

(2) charging the electrophotographic photosensitive member for 0.005 second so that an absolute value of an initial surface potential of the electrophotographic photosensitive member becomes $V_0$ [V];

(3) after 0.02 second from start of the charging, continuously exposing the electrophotographic photosensitive member to light having a wavelength of 805 [nm] and an intensity of 25 [mW/cm$^2$] for "t" second(s) so as to achieve an exposure amount of $I_{exp}$ [μJ/cm$^2$];

(4): after 0.06 second from the start of the charging, measuring an absolute value of a surface potential of the electrophotographic photosensitive member after the exposure which is represented by $V_{exp}$ [V];

(5) repeating operations (1) to (4) while changing $I_{exp}$ from 0.000 [μJ/cm$^2$] to 1.000 [μJ/cm$^2$] at intervals of 0.001 [μJ/cm$^2$], in order to obtain $V_{exp}$ [V] corresponding to each $I_{exp}$; and (6) $V_{exp}$ [V] at t=0 and $I_{exp}$=0.000 [μJ/cm$^2$] in operation (3) is a charged potential $V_d$ [V], and the $V_0$ [V] in operation (2) is set such that $V_d$ [V] is 300 V.

7. An electrophotographic apparatus, comprising:
an electrophotographic photosensitive member;
a charging unit;
an image exposing unit;
a developing unit; and
a transferring unit,
the electrophotographic photosensitive member comprising a support, a charge-generating layer formed on the support, and a charge-transporting layer formed on the charge-generating layer;
the electrophotographic photosensitive member being an organic photosensitive member;
the charge-generating layer containing a hydroxygallium phthalocyanine pigment, the hydroxygallium phthalocyanine pigment containing (i) crystal grains of a crystal form showing peaks at Bragg angles 2θ of 7.4°±0.3° and 28.2°±0.3° in an X-ray diffraction spectrum using a CuKα ray, and (ii)N-methylformamide; and
the charge-transporting layer contains a triarylamine compound represented by (CTM-1) and a triarylamine compound represented by (CTM-2) as charge-transporting substances (CTM-1)

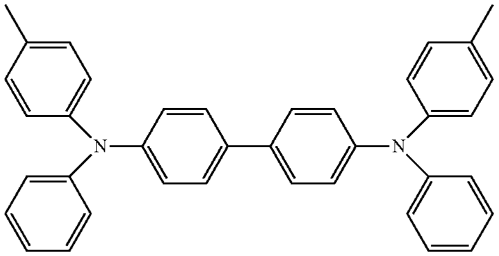

(CTM-2)

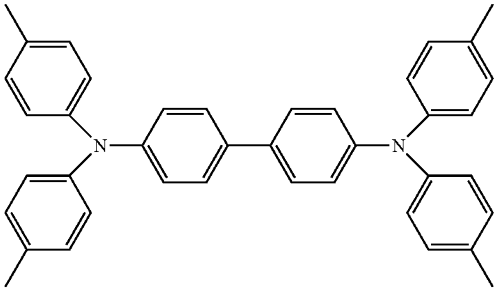

wherein, in an EV curve graph that is obtained at a temperature of 23.5 [° C.] and a relative humidity of 50 [% RH] having a horizontal axis representing $I_{exp}$ and a vertical axis representing $V_{exp}$, when $V_r$ [V] is $V_{exp}$ at $I_{exp}$=0.500 [μJ/cm$^2$], $S_{max}$ [V·μJ/cm$^2$] is a maximum value of $S=I_{exp}\cdot(V_{exp}-V_r)$ in a range of $I_{exp}$=0.000 to 0.030 [μJ/cm$^2$], $S_i=I_i\cdot(V_i-V_r)$ [V·μJ/cm$^2$] is a product of a light amount $I_i$ [μJ/cm$^2$] on the horizontal axis and a potential $V_i$ [V] on the vertical axis at a point of intersection between an approximate straight line in a range of $I_{exp}$=0.000 to 0.010 [μJ/cm$^2$] and an approximate straight line in a range of $I_{exp}$=0.490 to 0.500 [μJ/cm$^2$], and AR≤0.10 when AR is $S_i/S_{max}$, and $V_r$ [V] satisfies $V_r$≤30, and the EV curve is measured by steps comprising (1) setting a surface potential of the electrophotographic photosensitive member to 0 [V];

(2) charging the electrophotographic photosensitive member for 0.005 second so that an absolute value of an initial surface potential of the electrophotographic photosensitive member becomes $V_0$ [V];

(3) after 0.02 second from start of the charging, continuously exposing the electrophotographic photosensitive member to light having a wavelength of 805 [nm] and an intensity of 25 [mW/cm$^2$] for "t" second(s) so as to achieve an exposure amount of $I_{exp}$ [μJ/cm$^2$];

(4): after 0.06 second from the start of the charging, measuring an absolute value of a surface potential of the electrophotographic photosensitive member after the exposure which is represented by $V_{exp}$ [V];

(5) repeating operations (1) to (4) while changing $I_{exp}$ from 0.000 [μJ/cm$^2$] to 1.000 [μJ/cm$^2$] at intervals of 0.001 [μJ/cm$^2$], in order to obtain $V_{exp}$ [V] corresponding to each $I_{exp}$; and (6) $V_{exp}$ [V] at t=0 and $I_{exp}$=0.000 [μJ/cm$^2$] in operation (3) is a charged potential $V_d$ [V], and the $V_0$ [V] in operation (2) is set such that $V_d$ [V] is 300 V.

* * * * *